United States Patent
Kurosaki et al.

(10) Patent No.: US 12,375,782 B2
(45) Date of Patent: Jul. 29, 2025

(54) OPTICAL SYSTEM, IMAGING DEVICE, AND IMAGING SYSTEM

(71) Applicant: Panasonic Holdings Corporation, Osaka (JP)

(72) Inventors: Ryo Kurosaki, Hyogo (JP); Toru Nanba, Osaka (JP); Jun Murata, Osaka (JP); Tetsuya Suzuki, Osaka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 88 days.

(21) Appl. No.: 18/102,879

(22) Filed: Jan. 30, 2023

(65) Prior Publication Data
US 2023/0179842 A1    Jun. 8, 2023

Related U.S. Application Data

(63) Continuation of application No. PCT/JP2021/010288, filed on Mar. 15, 2021.

(30) Foreign Application Priority Data

Aug. 24, 2020 (JP) .................. 2020-140727

(51) Int. Cl.
*H04N 23/16* (2023.01)
*G02B 13/14* (2006.01)
(Continued)

(52) U.S. Cl.
CPC ............. *H04N 23/16* (2023.01); *G02B 13/14* (2013.01); *G02B 27/1013* (2013.01); *H04N 23/11* (2023.01)

(58) Field of Classification Search
CPC ........ H04N 23/16; H04N 23/11; H04N 23/45; H04N 23/55; G02B 27/1013; G02B 13/14
See application file for complete search history.

(56) References Cited

U.S. PATENT DOCUMENTS 4,087,689 A * 5/1978 Asawa .................. G02B 23/12
250/342
4,702,569 A 10/1987 Mercado et al.
(Continued)

FOREIGN PATENT DOCUMENTS

CN 108761733 11/2018
CN 109407273 3/2019
(Continued)

OTHER PUBLICATIONS

International Preliminary Report on Patentability dated Mar. 2, 2023 in International (PCT) Application No. PCT/JP2021/010288.
(Continued)

*Primary Examiner* — Kathleen V Nguyen
(74) *Attorney, Agent, or Firm* — Wenderoth, Lind & Ponack L.L.P.

(57) ABSTRACT

An optical system includes: a lens group having an optical axis, a focal length of a first light, and a focal length of a second light; and a light splitter disposed at rear side of the lens group and splitting the first light and the second light incident from the lens group respectively, to guide the first light onto first imaging position and guide the second light onto second imaging position. The lens group includes lens elements transmitting the first light and the second light to match the first imaging position with the focal length of the first light and match the second imaging position with the focal length of the second light separately from the first imaging position. The lens element of the lens group is provided in front side of the light splitter with no lens element being provided in the rear side of the light splitter.

16 Claims, 27 Drawing Sheets

(51) Int. Cl.
*G02B 27/10* (2006.01)
*H04N 23/11* (2023.01)

(56) References Cited

U.S. PATENT DOCUMENTS

2011/0079713 A1   4/2011  Kim et al.
2021/0129466 A1*  5/2021  Nanba .................... G02B 1/041

FOREIGN PATENT DOCUMENTS

| | | |
|---|---|---|
| JP | 59-69711 | 4/1984 |
| JP | 2006-235139 | 9/2006 |
| JP | 2006-324810 | 11/2006 |
| JP | 2011-80976 | 4/2011 |
| JP | 2014185917 | * 10/2014 |
| JP | 2017-163297 | 9/2017 |
| WO | 2020/071071 | 4/2020 |

OTHER PUBLICATIONS

International Search Report issued Jun. 1, 2021 in International (PCT) Application No. PCT/JP2021/010288.
Office Action issued Mar. 25, 2025 in Japanese Patent Application No. 2022-545291, with English-language Translation.
Office Action issued Jun. 3, 2025 in corresponding Japanese Application No. 2022-545291 with machine translation.

* cited by examiner

Fig. 5

| NAME | COMPOSITIONS | REFRACTIVE INDEX | | Nr |
|---|---|---|---|---|
| | | nvis | nir | |
| chalcohalide A (CHA) | Ge,Ga,Cs,S,Br | 2.108 | 1.975 | 1.139 |
| chalcohalide B (CHB) | Ge,Sb,Cs,S,Cl | 2.292 | 2.121 | 1.152 |
| chalcohalide C (CHC) | Ge,Ga,Cs,S,I | 2.071 | 1.922 | 1.162 |
| zinc sulfate (ZnS) | ZnS | 2.372 | 2.201 | 1.142 |
| zinc selenide (ZnSe) | ZnSe | 2.626 | 2.407 | 1.156 |

Fig. 9

| | FIRST EXAMPLE OF FIRST EMBODIMENT | | | | | | | |
|---|---|---|---|---|---|---|---|---|
| | FOR FAR-IR LIGHT | | | | FOR VISIBLE LIGHT | | | |
| No. | shape | curvature radius | surface interval | material | shape | curvature radius | surface interval | material | remarks |
| S1 | spherical | ∞ | ∞ | | common | | | | object |
| S2 | aspherical | −12.806 | 2.500 | CHA | common | | | | |
| S3 | aspherical | −19.282 | 4.000 | | common | | | | |
| S4 | spherical | ∞ | 0.000 | | common | | | | diaphragm |
| S5 | spherical | 20.264 | 2.500 | ZnS | common | | | | |
| S6 | spherical | −9.963 | 2.500 | | common | | | | |
| S7 | spherical | ∞ | 0.000 | mirror | spherical | ∞ | 0.5 | BK7 | light splitter (45° tilt) |
| S8 | spherical | ∞ | 3.500 | | spherical | ∞ | 3.717 | | |
| S9 | spherical | ∞ | 0.750 | Si | spherical | ∞ | 0 | | image plane (visible) |
| S10 | spherical | ∞ | 1.500 | | | | | | |
| S11 | spherical | ∞ | 0.000 | | | | | | image plane (far-ir) |

| | S2 | S3 |
|---|---|---|
| k | 0 | 0 |
| A4 | 2.64.E-04 | 9.73.E-04 |
| A6 | 1.71.E-06 | 1.91.E-05 |
| A8 | 3.87.E-07 | -8.87.E-07 |

| F number | 2.0 |
|---|---|
| view angle(deg.) | 28 |
| focal length Fir (mm) | 6.8 |

Fig. 10

| SECOND EXAMPLE OF FIRST EMBODIMENT ||||||||||
|---|---|---|---|---|---|---|---|---|---|
| | FOR FAR-IR LIGHT |||| FOR VISIBLE LIGHT |||| |
| No. | shape | curvature radius | surface interval | material | shape | curvature radius | surface interval | material | remarks |
| S1 | spherical | ∞ | ∞ | | common |||| object |
| S2 | aspherical | -12.802 | 2.500 | CHA | common |||| |
| S3 | aspherical | -15.105 | 4.000 | | common |||| |
| S4 | spherical | ∞ | 0.000 | | common |||| diaphragm |
| S5 | spherical | -56.411 | 2.500 | ZnS | common |||| |
| S6 | spherical | -7.869 | 2.500 | | common |||| |
| S7 | spherical | ∞ | 0.000 | mirror | spherical | ∞ | 0.5 | BK7 | light splitter (45° tilt) |
| S8 | spherical | ∞ | 3.500 | | spherical | ∞ | 4.046 | | |
| S9 | spherical | ∞ | 0.750 | Si | spherical | ∞ | 0 | | image plane (visible) |
| S10 | spherical | ∞ | 1.500 | | | | | | |
| S11 | spherical | ∞ | 0.000 | | | | | | image plane (far-ir) |

D12a

| | S2 | S3 |
|---|---|---|
| k | 0 | 0 |
| A4 | 3.27.E-03 | 4.23.E-03 |
| A6 | -2.17.E-04 | -1.99.E-04 |
| A8 | 4.52.E-06 | 3.11.E-06 |

D12b

| F number | 2.0 |
|---|---|
| view angle(deg.) | 28 |
| focal length Fir (mm) | 6.8 |

| THIRD EXAMPLE OF FIRST EMBODIMENT |||||||||| |
|---|---|---|---|---|---|---|---|---|---|
| | FOR FAR-IR LIGHT |||| FOR VISIBLE LIGHT |||| |
| No. | shape | curvature radius | surface interval | material | shape | curvature radius | surface interval | material | remarks |
| S1 | spherical | ∞ | ∞ | | common |||| object |
| S2 | aspherical | -12.266 | 2.500 | CHA | common |||| |
| S3 | aspherical | -18.477 | 4.000 | | common |||| |
| S4 | spherical | ∞ | 0.000 | | common |||| diaphragm |
| S5 | spherical | 9.044 | 2.500 | ZnS | common |||| |
| S6 | spherical | -332.639 | 2.500 | | common |||| |
| S7 | spherical | ∞ | 0.000 | mirror | spherical | ∞ | 0.5 | BK7 | light splitter (45° tilt) |
| S8 | spherical | ∞ | 3.500 | | spherical | ∞ | 3.117 | | |
| S9 | spherical | ∞ | 0.750 | Si | spherical | ∞ | 0 | | image plane (visible) |
| S10 | spherical | ∞ | 1.500 | | | | | | |
| S11 | spherical | ∞ | 0.000 | | | | | | image plane (far-ir) |

| | S2 | S3 |
|---|---|---|
| k | 0 | 0 |
| A4 | -3.48.E-03 | -2.50.E-03 |
| A6 | 3.48.E-04 | 2.92.E-04 |
| A8 | -6.90.E-06 | -6.18.E-06 |

| F number | 2.0 |
|---|---|
| view angle(deg.) | 28 |
| focal length Fir (mm) | 6.8 |

Fig. 14

| FIRST EXAMPLE OF SECOND EMBODIMENT |||||||||| |
|---|---|---|---|---|---|---|---|---|---|
| | FOR FAR-IR LIGHT |||| FOR VISIBLE LIGHT |||| |
| No. | shape | curvature radius | surface interval | material | shape | curvature radius | surface interval | material | remarks |
| S1 | spherical | ∞ | ∞ | | common |||| object |
| S2 | aspherical | −12.354 | 2.500 | CHA | common |||| |
| S3 | aspherical | −18.501 | 4.000 | | common |||| |
| S4 | spherical | ∞ | 0.000 | | common |||| diaphragm |
| S5 | spherical | 17.833 | 2.500 | CHA | common |||| |
| S6 | spherical | −10.659 | 2.500 | | common |||| |
| S7 | spherical | ∞ | 0.000 | mirror | spherical | ∞ | 0.5 | BK7 | light splitter (45° tilt) |
| S8 | spherical | ∞ | 3.500 | | spherical | ∞ | 3.867 | | |
| S9 | spherical | ∞ | 0.750 | Si | spherical | ∞ | 0 | | image plane (visible) |
| S10 | spherical | ∞ | 1.500 | | | | | | |
| S11 | spherical | ∞ | 0.000 | | | | | | image plane (far-ir) |

| | S2 | S3 |
|---|---|---|
| k | 0 | 0 |
| A4 | 3.16.E−04 | 1.18.E−03 |
| A6 | 9.53.E−06 | 8.18.E−06 |
| A8 | 1.45.E−07 | −7.08.E−07 |

| F number | 2.0 |
|---|---|
| view angle(deg.) | 28 |
| focal length Fir (mm) | 6.8 |

Fig. 15

| SECOND EXAMPLE OF SECOND EMBODIMENT | | | | | | | | | |
|---|---|---|---|---|---|---|---|---|---|
| | FOR FAR-IR LIGHT | | | | FOR VISIBLE LIGHT | | | | |
| No. | shape | curvature radius | surface interval | material | shape | curvature radius | surface interval | material | remarks |
| S1 | spherical | ∞ | ∞ | | common | | | | object |
| S2 | aspherical | −12.850 | 2.500 | CHA | common | | | | |
| S3 | aspherical | −16.475 | 4.000 | | common | | | | |
| S4 | spherical | ∞ | 0.000 | | common | | | | diaphragm |
| S5 | spherical | 222.465 | 2.500 | CHA | common | | | | |
| S6 | spherical | −7.354 | 2.500 | | common | | | | |
| S7 | spherical | ∞ | 0.000 | mirror | spherical | ∞ | 0.5 | BK7 | light splitter (45° tilt) |
| S8 | spherical | ∞ | 3.500 | | spherical | ∞ | 4.196 | | |
| S9 | spherical | ∞ | 0.750 | Si | spherical | ∞ | 0 | | image plane (visible) |
| S10 | spherical | ∞ | 1.500 | | | | | | |
| S11 | spherical | ∞ | 0.000 | | | | | | image plane (far-ir) |

D22b

| | S2 | S3 |
|---|---|---|
| k | 0 | 0 |
| A4 | 3.16.E-03 | 4.29.E-03 |
| A6 | −2.14.E-04 | −2.16.E-04 |
| A8 | 4.49.E-06 | 3.51.E-06 |

D22a

D22c

| F number | 2.0 |
|---|---|
| view angle(deg.) | 28 |
| focal length Fir (mm) | 6.8 |

*Fig. 16*

| THIRD EXAMPLE OF SECOND EMBODIMENT ||||||||||
|---|---|---|---|---|---|---|---|---|---|
| | FOR FAR-IR LIGHT |||| FOR VISIBLE LIGHT |||| |
| No. | shape | curvature radius | surface interval | material | shape | curvature radius | surface interval | material | remarks |
| S1 | spherical | ∞ | ∞ | | common |||| object |
| S2 | aspherical | -12.1757 | 2.500 | CHA | common |||| |
| S3 | aspherical | -19.8556 | 4.000 | | common |||| |
| S4 | spherical | ∞ | 0.000 | | common |||| diaphragm |
| S5 | spherical | 9.782 | 2.500 | CHA | common |||| |
| S6 | spherical | -21.074 | 2.500 | | common |||| |
| S7 | spherical | ∞ | 0.000 | mirror | spherical | ∞ | 0.5 | BK7 | light splitter (45° tilt) |
| S8 | spherical | ∞ | 3.500 | | spherical | ∞ | 3.267 | | |
| S9 | spherical | ∞ | 0.750 | Si | spherical | ∞ | 0 | | image plane (visible) |
| S10 | spherical | ∞ | 1.500 | | | | | | |
| S11 | spherical | ∞ | 0.000 | | | | | | image plane (far-ir) |

D23b

| | S2 | S3 |
|---|---|---|
| k | 0 | 0 |
| A4 | -1.31.E-03 | -5.19.E-04 |
| A6 | 1.64.E-04 | 1.31.E-04 |
| A8 | -3.13.E-06 | -3.01.E-06 |

D23a

D23c

| F number | 2.0 |
|---|---|
| view angle(deg.) | 28 |
| focal length Fir (mm) | 6.8 |

Fig. 19

| | FIRST EXAMPLE OF THIRD EMBODIMENT ||||||||| |
|---|---|---|---|---|---|---|---|---|---|
| | FOR FAR-IR LIGHT |||| FOR VISIBLE LIGHT |||| |
| No. | shape | curvature radius | surface interval | material | shape | curvature radius | surface interval | material | remarks |
| S1 | spherical | ∞ | ∞ | | common |||| object |
| S2 | aspherical | −29.602 | 4.842 | CHA | common |||| |
| S3 | aspherical | −41.845 | 8.819 | | common |||| |
| S4 | spherical | ∞ | 2.299 | | common |||| diaphragm |
| S5 | spherical | −28.641 | 4.707 | ZnS | common |||| |
| S6 | spherical | −21.354 | 3.988 | | common |||| |
| S7 | spherical | 28.957 | 1.716 | CHA | common |||| |
| S8 | spherical | −119.947 | 6.160 | | common |||| |
| S9 | spherical | ∞ | 0.000 | mirror | spherical | ∞ | 0.5 | BK7 | light splitter (45° tilt) |
| S10 | spherical | ∞ | 10.009 | | spherical | ∞ | 8.852 | | |
| S11 | spherical | ∞ | 0.750 | Si | spherical | ∞ | 0 | | image plane (visible) |
| S12 | spherical | ∞ | 1.500 | | | | | | |
| S13 | spherical | ∞ | 0.000 | | | | | | image plane (far-ir) |

D31b

| | S2 | S3 |
|---|---|---|
| k | 0 | 0 |
| A4 | 1.14.E-04 | 1.43.E-04 |
| A6 | −8.34.E-07 | −1.58.E-07 |
| A8 | 3.76.E-09 | −2.09.E-09 |

D31a

D31c

| F number | 2.0 |
|---|---|
| view angle(deg.) | 13 |
| focal length Fir (mm) | 15 |

Fig. 20

| | SECOND EXAMPLE OF THIRD EMBODIMENT | | | | | | | | |
|---|---|---|---|---|---|---|---|---|---|
| | FOR FAR-IR LIGHT | | | | FOR VISIBLE LIGHT | | | | |
| No. | shape | curvature radius | surface interval | material | shape | curvature radius | surface interval | material | remarks |
| S1 | spherical | ∞ | ∞ | | common | | | | object |
| S2 | aspherical | -29.185 | 4.720 | CHA | common | | | | |
| S3 | aspherical | -42.807 | 8.297 | | common | | | | |
| S4 | spherical | ∞ | 2.299 | | common | | | | diaphragm |
| S5 | spherical | -19.771 | 2.471 | ZnS | common | | | | |
| S6 | spherical | -16.665 | 4.939 | | common | | | | |
| S7 | spherical | 19.143 | 1.763 | CHA | common | | | | |
| S8 | spherical | 101.895 | 6.160 | | common | | | | |
| S9 | spherical | ∞ | 0.000 | mirror | spherical | ∞ | 0.5 | BK7 | light splitter (45° tilt) |
| S10 | spherical | ∞ | 10.009 | | spherical | ∞ | 9.912 | | |
| S11 | spherical | ∞ | 0.750 | Si | spherical | ∞ | 0 | | image plane (visible) |
| S12 | spherical | ∞ | 1.500 | | | | | | |
| S13 | spherical | ∞ | 0.000 | | | | | | image plane (far-ir) |

| | S2 | S3 |
|---|---|---|
| k | 0 | 0 |
| A4 | 1.21.E-04 | 1.39.E-04 |
| A6 | -8.34.E-07 | -1.51.E-07 |
| A8 | 3.59.E-09 | -2.03.E-09 |

| F number | 2.0 |
|---|---|
| view angle(deg.) | 13 |
| focal length Fir (mm) | 15 |

Fig. 21

| | THIRD EXAMPLE OF THIRD EMBODIMENT | | | | | | | | |
|---|---|---|---|---|---|---|---|---|---|
| | FOR FAR-IR LIGHT | | | | FOR VISIBLE LIGHT | | | | |
| No. | shape | curvature radius | surface interval | material | shape | curvature radius | surface interval | material | remarks |
| S1 | spherical | ∞ | ∞ | | common | | | | object |
| S2 | aspherical | -27.494 | 4.844 | CHA | common | | | | |
| S3 | aspherical | -41.756 | 8.815 | | common | | | | |
| S4 | spherical | ∞ | 2.295 | | common | | | | diaphragm |
| S5 | spherical | -18.642 | 6.802 | ZnS | common | | | | |
| S6 | spherical | -16.682 | 3.987 | | common | | | | |
| S7 | spherical | 16.826 | 6.078 | CHA | common | | | | |
| S8 | spherical | 29.195 | 8.995 | | common | | | | |
| S9 | spherical | ∞ | 0.000 | mirror | spherical | ∞ | 0.5 | BK7 | light splitter (45° tilt) |
| S10 | spherical | ∞ | 10.009 | | spherical | ∞ | 7.687 | | |
| S11 | spherical | ∞ | 0.750 | Si | spherical | ∞ | 0 | | image plane (visible) |
| S12 | spherical | ∞ | 1.500 | | | | | | |
| S13 | spherical | ∞ | 0.000 | | | | | | image plane (far-ir) |

| | S2 | S3 |
|---|---|---|
| k | 0 | 0 |
| A4 | 1.11.E-04 | 1.44.E-04 |
| A6 | -9.33.E-07 | -1.64.E-07 |
| A8 | 4.70.E-09 | -2.07.E-09 |

| F number | 2.0 |
|---|---|
| view angle(deg.) | 13 |
| focal length Fir (mm) | 15 |

Fig. 24

| | FIRST EXAMPLE OF FOURTH EMBODIMENT | | | | | | | | |
|---|---|---|---|---|---|---|---|---|---|
| | FOR FAR-IR LIGHT | | | | FOR VISIBLE LIGHT | | | | |
| No. | shape | curvature radius | surface interval | material | shape | curvature radius | surface interval | material | remarks |
| S1 | spherical | ∞ | ∞ | | common | | | | object |
| S2 | aspherical | −13.615 | 3.500 | CHC | common | | | | |
| S3 | spherical | −180.399 | 1.247 | | common | | | | |
| S4 | spherical | 38.014 | 4.598 | ZnS | common | | | | |
| S5 | aspherical | −48.259 | 4.867 | | common | | | | |
| S6 | spherical | ∞ | 3.078 | | common | | | | diaphragm |
| S7 | spherical | −17.350 | 3.500 | CHB | common | | | | |
| S8 | spherical | −13.452 | 2.676 | | common | | | | |
| S9 | spherical | 21.910 | 3.500 | ZnSe | common | | | | |
| S10 | spherical | 29.261 | 6.167 | | common | | | | |
| S11 | spherical | ∞ | 0.000 | mirror | spherical | ∞ | 0.5 | BK7 | light splitter (45° tilt) |
| S12 | spherical | ∞ | 7.807 | | spherical | ∞ | 6.250 | | |
| S13 | spherical | ∞ | 0.750 | Si | spherical | ∞ | 0 | | image plane (visible) |
| S14 | spherical | ∞ | 1.500 | | | | | | |
| S15 | spherical | ∞ | 0.000 | | | | | | image plane (far-ir) |

| | S2 | S5 |
|---|---|---|
| k | 0 | 0 |
| A4 | 1.63.E−04 | 1.22.E−04 |
| A6 | −2.17.E−08 | −3.45.E−08 |
| A8 | 2.71.E−09 | 7.35.E−09 |

| F number | 2.0 |
|---|---|
| view angle(deg.) | 13 |
| focal length Fir (mm) | 15 |

Fig. 25

| | SECOND EXAMPLE OF FOURTH EMBODIMENT | | | | | | | | |
|---|---|---|---|---|---|---|---|---|---|
| | FOR FAR-IR LIGHT | | | | FOR VISIBLE LIGHT | | | | |
| No. | shape | curvature radius | surface interval | material | shape | curvature radius | surface interval | material | remarks |
| S1 | spherical | ∞ | ∞ | | common | | | | object |
| S2 | aspherical | -13.929 | 3.500 | CHC | common | | | | |
| S3 | spherical | -198.969 | 1.247 | | common | | | | |
| S4 | spherical | 36.808 | 4.598 | ZnS | common | | | | |
| S5 | aspherical | -43.783 | 4.799 | | common | | | | |
| S6 | spherical | ∞ | 3.078 | | common | | | | diaphragm |
| S7 | spherical | 62.516 | 3.500 | CHB | common | | | | |
| S8 | spherical | -15.849 | 0.000 | | common | | | | |
| S9 | spherical | -21.293 | 3.501 | ZnSe | common | | | | |
| S10 | spherical | -51.578 | 6.167 | | common | | | | |
| S11 | spherical | ∞ | 0.000 | mirror | spherical | ∞ | 0.5 | BK7 | light splitter (45° tilt) |
| S12 | spherical | ∞ | 7.807 | | spherical | ∞ | 7.760 | | |
| S13 | spherical | ∞ | 0.750 | Si | spherical | ∞ | 0 | | image plane (visible) |
| S14 | spherical | ∞ | 1.500 | | | | | | |
| S15 | spherical | ∞ | 0.000 | | | | | | image plane (far-ir) |

D42b

| | S2 | S5 |
|---|---|---|
| k | 0 | 0 |
| A4 | 1.29.E-04 | 1.06.E-04 |
| A6 | -2.51.E-08 | 4.91.E-07 |
| A8 | 3.03.E-09 | 1.15.E-09 |

D42a

D42c

| F number | 2.0 |
|---|---|
| view angle(deg.) | 13 |
| focal length Fir (mm) | 15 |

Fig. 26

| | THIRD EXAMPLE OF FOURTH EMBODIMENT ||||||||| |
|---|---|---|---|---|---|---|---|---|---|
| | FOR FAR-IR LIGHT |||| FOR VISIBLE LIGHT |||| |
| No. | shape | curvature radius | surface interval | material | shape | curvature radius | surface interval | material | remarks |
| S1 | spherical | ∞ | ∞ | | common |||| object |
| S2 | aspherical | −13.521 | 3.500 | CHC | common |||| |
| S3 | spherical | −169.895 | 1.247 | | common |||| |
| S4 | spherical | −66.506 | 4.598 | ZnS | common |||| |
| S5 | aspherical | −25.184 | 4.000 | | common |||| |
| S6 | spherical | ∞ | 2.491 | | common |||| diaphragm |
| S7 | spherical | −15.115 | 3.500 | CHB | common |||| |
| S8 | spherical | −11.254 | 10.319 | | common |||| |
| S9 | spherical | 12.814 | 3.501 | ZnSe | common |||| |
| S10 | spherical | 12.423 | 6.167 | | common |||| |
| S11 | spherical | ∞ | 0.000 | mirror | spherical | ∞ | 0.5 | BK7 | light splitter (45° tilt) |
| S12 | spherical | ∞ | 7.807 | | spherical | ∞ | 5.362 | | |
| S13 | spherical | ∞ | 0.750 | Si | spherical | ∞ | 0 | | image plane (visible) |
| S14 | spherical | ∞ | 1.500 | | | | | | |
| S15 | spherical | ∞ | 0.000 | | | | | | image plane (far-ir) |

| | S2 | S5 |
|---|---|---|
| k | 0 | 0 |
| A4 | 1.86.E-04 | 1.60.E-04 |
| A6 | −5.39.E-08 | 1.46.E-06 |
| A8 | 2.51.E-09 | 2.16.E-08 |

| F number | 2.0 |
|---|---|
| view angle(deg.) | 13 |
| focal length Fir (mm) | 15 |

D43b
D43a
D43c

OPTICAL SYSTEM, IMAGING DEVICE, AND IMAGING SYSTEM

BACKGROUND

1. Technical Field

The present disclosure relates to an optical system, an imaging device, and an imaging system for imaging in a visible range and imaging in a far-infrared range.

2. Related Art

JP 2011-80976 A discloses a uniaxial lens module for a thermal image camera for the purpose of acquiring a vivid image by simultaneously photographing visible light and a far infrared band by the thermal image camera. The lens module includes an objective lens facing a subject, a light flux separator that is located behind the objective lens, reflects far infrared rays from light transmitted through the objective lens, and transmits visible light, a visible light imaging lens located behind the light flux separator, and a far infrared imaging lens. The visible light imaging lens forms an image on a CCD sensor located on the rear side with visible light from the light flux separator. The far infrared imaging lens forms an image on a far infrared detector that converts an optical image into a thermal image signal and outputs the thermal image signal with far infrared rays from the light flux separator.

SUMMARY

The present disclosure provides an optical system, an imaging device, and an imaging system capable of facilitating both imaging in a far-infrared range and a shorter-wavelength range.

An optical system in the present disclosure is an optical system for forming an image at a first imaging position with first light, and forming another image at a second imaging position with second light having a wavelength in a far-infrared range in which a wavelength is longer than a wavelength of the first light. The optical system includes a lens group and a light splitter. The lens group has an optical axis, a focal length of the first light, and a focal length of the second light, the optical axis extending from a front side on which the first light and the second light are incident to a rear side on which the first light and the second light are emitted. The light splitter is disposed at the rear side of the lens group, and splits the first light and the second light incident from the lens group respectively, to guide the first light onto the first imaging position, and guide the second light onto the second imaging position. The lens group includes lens elements transmitting the first light and the second light to match the first imaging position with the focal length of the first light and match the second imaging position with the focal length of the second light separately from the first imaging position. The lens element of the lens group is provided in the front side of the light splitter with no lens element being provided in the rear side of the light splitter.

An imaging device in the present disclosure includes the above-described optical system, a first image sensor, and a second image sensor. The first image sensor is disposed at the first imaging position to capture the image formed with the first light. The second image sensor is disposed at the second imaging position to capture the image formed with the second light.

An imaging system in the present disclosure includes the above-described imaging device and a control circuit that analyzes a captured image by the imaging device.

According to the optical system and the imaging device of the present disclosure, it is possible to facilitate both imaging in the far-infrared range and the shorter-wavelength range.

BRIEF DESCRIPTION OF THE DRAWINGS

FIG. 5 is a diagram showing data of various lens materials in the optical system.

FIG. 9 is a table showing a first numerical example of the optical system of the first embodiment.

FIG. 10 is a table showing a second numerical example of the optical system of the first embodiment.

FIG. 11 is a table showing a third numerical example of the optical system of the first embodiment.

FIG. 14 is a table showing the first numerical example of the optical system of the second embodiment.

FIG. 15 is a table showing the second numerical example of the optical system of the second embodiment.

FIG. 16 is a table showing the third numerical example of the optical system of the second embodiment.

FIG. 19 is a table showing the first numerical example of the optical system of the third embodiment.

FIG. 20 is a table showing the second numerical example of the optical system of the third embodiment.

FIG. 21 is a table showing the third numerical example of the optical system of the third embodiment.

FIG. 24 is a table showing the first numerical example of the optical system of the fourth embodiment.

FIG. 25 is a table showing the second numerical example of the optical system of the fourth embodiment.

FIG. 26 is a table showing the third numerical example of the optical system of the fourth embodiment.

DESCRIPTION OF EMBODIMENTS

Embodiments will be described in detail below with reference to the drawings as appropriate. However, more detailed description than necessary may be omitted. For example, detailed description of already well-known matters and redundant description of substantially the same configuration may be omitted. This is to avoid the following description from becoming unnecessary redundant and to facilitate understanding by those skilled in the art.

In addition, the applicant(s) provides the accompanying drawings and the following description to enable those skilled in the art to sufficiently understand the present disclosure, which does not intend to limit the claimed subject matter.

First Embodiment

Hereinafter, a first embodiment of the present disclosure will be described with reference to the drawings. In the present embodiment, an imaging device that achieves both imaging in a visible range and imaging in a far-infrared range and an optical system thereof will be described.

1. Imaging Device

Figure 1:
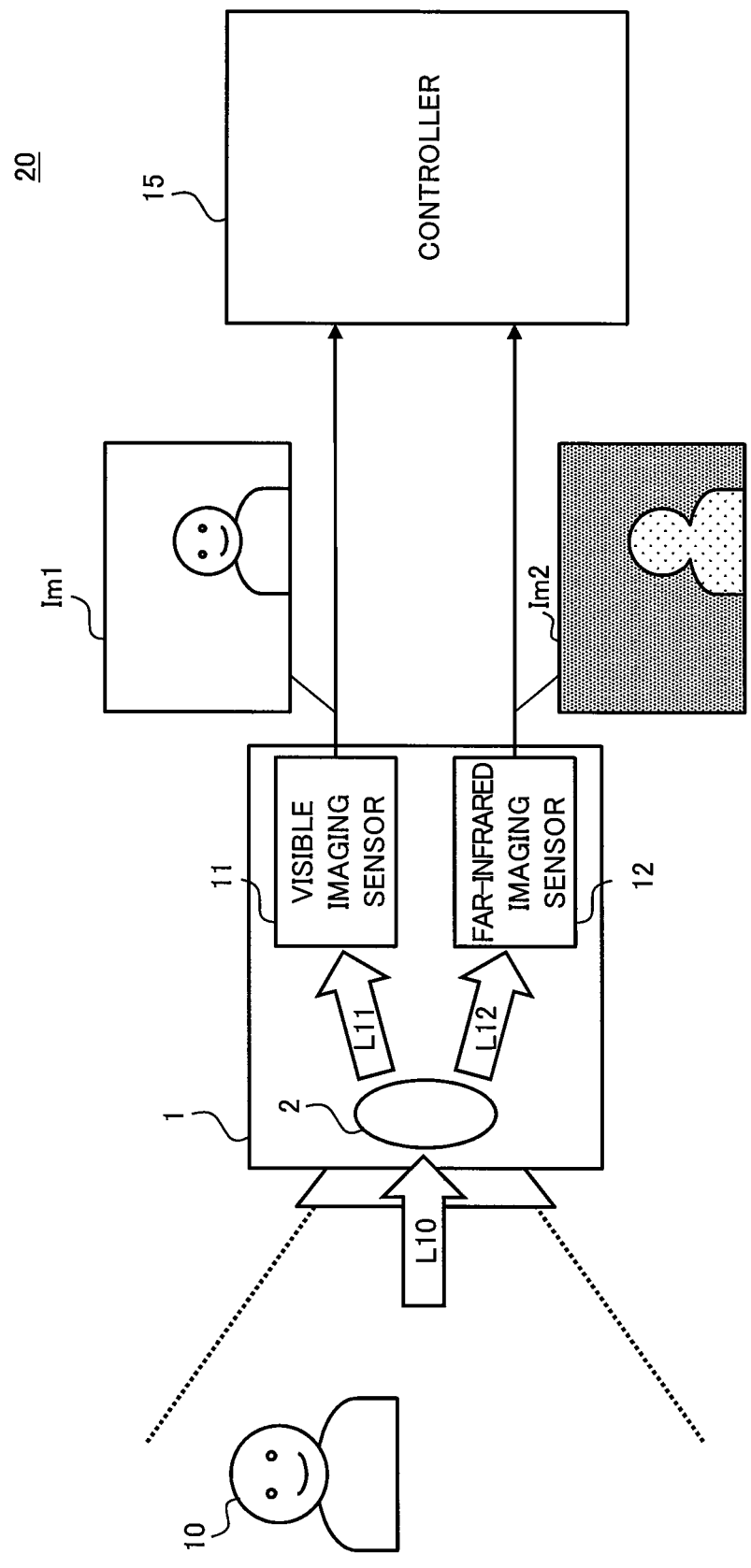
FIG. 1 is a diagram for explaining an imaging device and an imaging system according to a first embodiment of the present disclosure.

FIG. 1 is a diagram for explaining an imaging device 1 and an imaging system 20 according to the present embodiment. The imaging system 20 of the present embodiment includes the imaging device 1 and a controller 15.

In the present embodiment, as shown in FIG. 1, the imaging device 1 includes an optical system 2, a visible imaging sensor 11, and a far-infrared imaging sensor 12, for example. The imaging device 1 of the present embodiment is a camera device that coaxially performs visible imaging and far-infrared imaging by the optical system 2, wherein the visible imaging is imaging in a visible range, and the far-infrared imaging is imaging in a far-infrared range. For example, the wavelength in the visible range is 400 nm to 750 nm, and the wavelength in the far-infrared range is 3 μm to 20 μm. For example, such a part of the visible range and a part of the far-infrared range are targets of visible imaging and far-infrared imaging by the imaging device 1. For example, the far-infrared range may be 7 μm to 12 μm.

The imaging device 1 of the present embodiment can be applied to various applications such as combination of thermal imaging using far-infrared imaging, human sensor, night vision or the like, with visible imaging or the like. For example, in the present system 20, image analysis such as checking the temperature of a subject 10 e.g. a person and performing personal recognition on the same subject 10 can be applied. Various application examples are considered in the imaging device 1 of the present system 20 such as being incorporated in various electronic devices such as a mobile terminal, mounted on a moving object such as a drone or a vehicle, installed like a monitoring camera, or the like. In such various application examples, downsizing of the imaging device 1 is useful.

In the imaging device 1 of the present embodiment, the optical system 2 takes in light L10 incident from the subject 10, guides visible light L11 among the incident light L10 to the visible imaging sensor 11, and guides far-infrared light L12 among the incident light L10 to the far-infrared imaging sensor 12. According to the optical system 2, it is possible to provide a small device configuration in which one lens barrel is provided in the imaging device 1. The optical system 2 of the present embodiment has a configuration capable of further downsizing. The configuration of the optical system 2 will be described later.

For example, the visible imaging sensor 11 is various imaging elements made of a material such as amorphous silicon having light receiving sensitivity in a visible range, such as a CCD or a CMOS image sensor. The visible imaging sensor 11 has an image plane in which a plurality of pixels are arranged at a predetermined pitch. The pixel pitch of the visible imaging sensor 11 is e.g. about 3 μm. The visible imaging sensor 11 captures an image formed on the image plane by the incidence of the visible light L11 via the optical system 2, to generate an image signal indicating a visible image Im1 that is the captured image in the visible range. The visible imaging sensor 11 is an example of a first image sensor in the present embodiment.

The far-infrared imaging sensor 12 is an imaging element having light receiving sensitivity in a far-infrared range, such as a bolometer, a thermopile, or an SOI diode. The far-infrared imaging sensor 12 has an image plane in which a plurality of pixels are arranged at a predetermined pitch. The pixel pitch of the far-infrared imaging sensor 12 is e.g. 10 μm to 300 μm. The far-infrared imaging sensor 12 captures an image formed on the image plane by the incidence of the far-infrared light L12 via the optical system 2, to generate an image signal indicating a far-infrared image Im2 that is the captured image in the far-infrared range. The far-infrared imaging sensor 12 is an example of a second image sensor in the present embodiment.

According to the imaging device 1 configured as described above, the visible image Im1 and the far-infrared image Im2 are output as coaxial imaging results using the optical system 2. Therefore, according to the imaging device 1 of the present embodiment, it is possible to suppress image shift of the subject 10 between the visible image Im1 and the far-infrared image Im2, for example. For example, it is possible to obtain image output facilitating to analyze in various applications combining visible imaging and far-infrared imaging.

In the present system 20, the controller 15 receives an image signal from the imaging device 1, and performs various image analysis based on the various images Im1 and Im2 indicated by the received image signal. For example, the controller 15 is an example of a control circuit including a CPU, an MPU, or the like to realize various functions by executing a program stored in an internal memory. The controller 15 may include a dedicated hardware circuit designed to realize a desired function. The controller 15 may include a CPU, an MPU, a GPU, a DSP, an FPGA, an ASIC, or the like.

For example, the controller 15 of the present system 20 performs personal recognition of the subject 10 based on the visible image Im1 captured by the visible imaging sensor 11 in the imaging device 1, and recognizes the temperature of the subject 10 based on the far-infrared image Im2 captured by the far-infrared imaging sensor 12. Furthermore, the controller 15 associates the recognition result from the visible image Im1 and the recognition result from the far-infrared image Im2 with each other based on the position of the subject 10 in each of the images Im1 and Im2, and manages the recognition results as information of the analysis result, for example. According to the present system 20, as the optical system 2 of the imaging device 1 can suppress the image shift of the same subject 10 between the visible image Im1 and the far-infrared image Im2, the controller 15 can easily perform the information management as described above.

The present embodiment provides the optical system 2 that can downsize the imaging device 1 as described above and can form an image with high accuracy with both the visible light L11 and the far-infrared light L12. Hereinafter, a configuration of the optical system 2 of the present embodiment will be described.

2. Optical System

Figure 2:
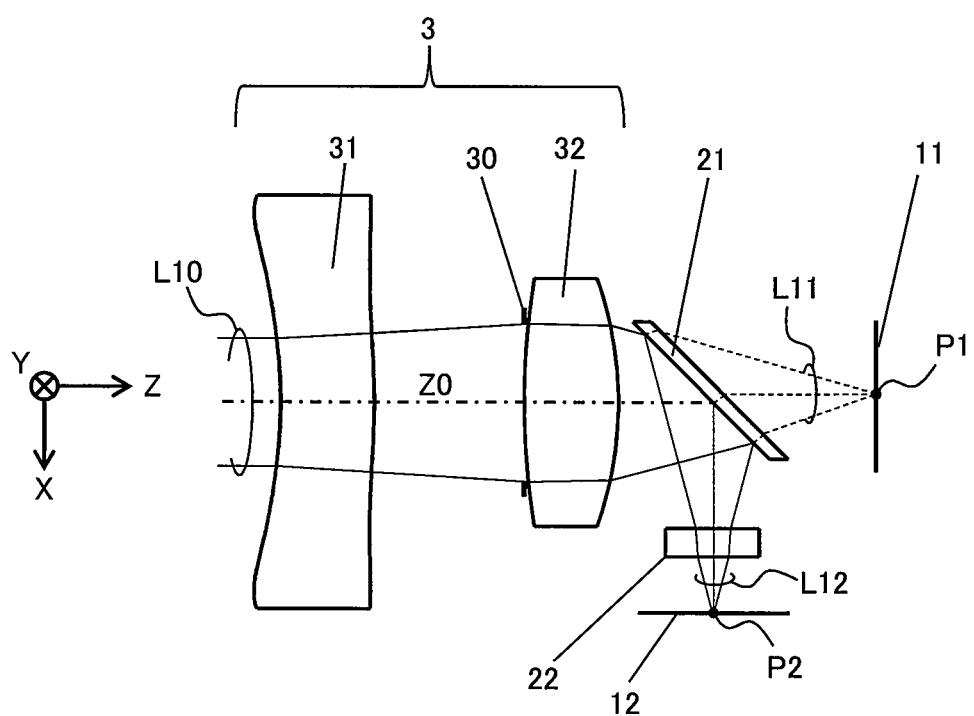
FIG. 2 is a diagram showing a configuration of an optical system according to the first embodiment.

FIG. 2 is a diagram showing a configuration of the optical system 2 according to the first embodiment. The optical system 2 includes a lens group 3 having an optical axis ZO on which the incident light L10 from the outside is incident, a light splitter 21 that splits the incident light L10 from the lens group 3 into the visible light L11 and the far-infrared light L12, and a far-infrared transmission filter 22. Hereinafter, a direction of the optical axis ZO of the lens group 3 in the optical system 2 is defined as a Z direction, and two directions orthogonal to the Z direction are defined as X and Y directions. An object side facing the outside from the optical system 2 in the Z direction is defined as a −Z side or a front side, and an opposite image surface side is defined as a +Z side or a rear side.

The optical system 2 has an imaging position P1 at which an image is formed by the visible light L11, and an imaging position P2 at which an image is formed by the far-infrared light L12 on the +Z side, that is, on the rear side. The image plane of the visible imaging sensor 11 is disposed at the imaging position P1 of the visible light L11 by the optical system 2. The image plane of the far-infrared imaging sensor 12 is disposed at the imaging position P2 of the far-infrared light L12. In the optical system 2, the light splitter 21 is provided between the lens group 3 and each of the imaging sensors 11 and 12. The far-infrared transmission filter 22 is provided between the light splitter 21 and the far-infrared imaging sensor 12.

The optical system 2 of the present embodiment is configured such that a lens element having refractive power is not provided between the light splitter 21 and each of the imaging sensors 11 and 12, for example. With this configuration, it is possible to reduce the size in view of the total length of the optical system 2, the number of components, or the like. Thus, it is possible to reduce the cost by reducing an alignment process of the lens after light splitting. In the present embodiment, in order to achieve both visible imaging and far-infrared imaging in such a small configuration, the lens group 3 on the −Z side (i.e., in front) of the light splitter 21 constitutes an imaging optical system of each of the visible light L11 and the far-infrared light L12 included in the incident light L10. In other words, the imaging positions P1 and P2 are set corresponding to the focal length of the lens group 3.

The lens group 3 in the optical system 2 is made of a lens material having optical transparency in both the visible range and the far-infrared range. Due to the wavelength dependency of the refractive index of the lens material, the focal length of the lens group 3 can vary depending on the wavelength of light to be imaged. The lens group 3 functions as an imaging optical system by applying refractive power corresponding to a focal length to the incident light L10 from the outside. The incident light L10 transmitted through the lens group 3 includes the visible light L11 and the far-infrared light L12, to be incident on the light splitter 21. The visible light L11 and the far-infrared light L12 are examples of first and second light in the present embodiment, respectively.

In the optical system 2 of the first embodiment, the lens group 3 includes two lens elements 31 and 32 and a diaphragm 30. In the lens group 3, the first lens element 31 and the second lens element 32 are disposed along the optical axis ZO in order from the front. In the first embodiment, as an example of the lens material, the first lens element 31 is made of chalcohalide A (CHA), and the second lens element 32 is made of zinc sulfide (ZnS) (see FIG. 5). In FIG. 5, three types of chalcohalide glasses having different compositions are exemplified and are referred to as chalcohalides A, B, and C, respectively. The lens material in the lens group 3 is not limited to the above, and may be various materials that transmit the wavelength band of the visible light L11 used for visible imaging in the visible range and the wavelength band of the far-infrared light L12 used for far-infrared imaging in the far-infrared range. For example, the wavelength band through which the lens material transmits may be 0.4 μm to 12 μm.

For example, the diaphragm 30 is an aperture diaphragm, to limit the light amounts of the visible light L11 and the far-infrared light L12 in the incident light L10. In the first embodiment, the diaphragm 30 is disposed between the first and second lens elements 31 and 32. The diaphragm 30 may be disposed at any position of the lens group 3, and is not necessarily provided in the optical system 2.

For example, as shown in FIG. 2, the light splitter 21 is configured to transmit the visible light L11 and emit the visible light L11 to the +Z side, and reflect the far-infrared light L12 and emit the far-infrared light L12 to the +X side, in the incident light L10 from the −Z side. For example, in a band pass filter having a specific wavelength band (i.e., a transmission band) for selectively transmitting light and having an optical characteristic for reflecting light other than the transmission band, the light splitter 21 is configured by setting the wavelength band of the visible light L11 as the transmission band in advance.

For example, the far-infrared transmission filter 22 is disposed on the +X side of the light splitter 21 in the configuration example of FIG. 2, to selectively transmit the far-infrared light L12. The far-infrared transmission filter 22 includes various filter elements such as a band pass filter in which the wavelength band of the far-infrared light L12 is set in advance as the transmission band.

In the optical system 2 of the present embodiment as described above, the lens group 3 as the imaging optical system is optically designed in consideration of back focus in which the visible light L11 and the far-infrared light L12 reach the respective imaging positions P1 and P2 via the light splitter 21 and the like behind the lens group 3.

2-1. Back Focus

A back focus in the optical system 2 of the present embodiment will be described with reference to FIGS. 3 and 4. Hereinafter, the focal length of the visible light L11 by the lens group 3 is referred to as "Fvis", and the focal length of the far-infrared light L12 is referred to as "Fir".

Figure 3:
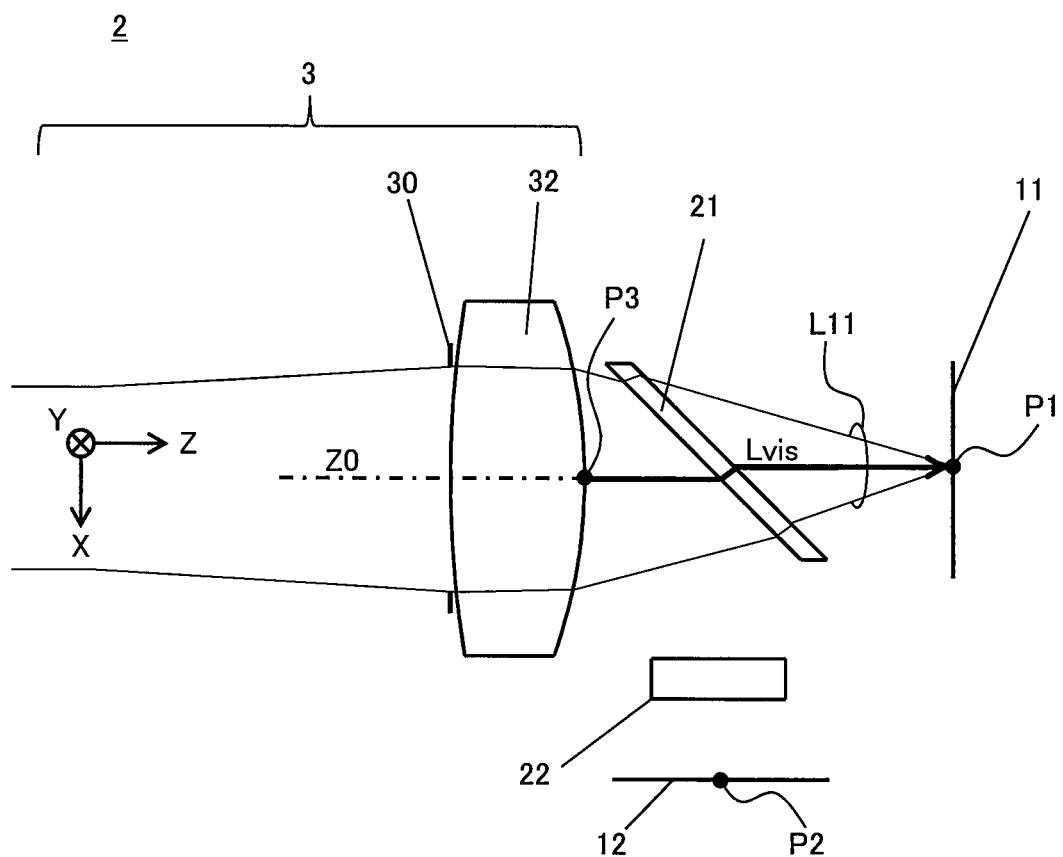
FIG. 3 is a diagram showing an optical path of visible light in a back focus of the optical system.

FIG. 3 shows an optical path of the visible light L11 from a rear position P3 of the lens group 3. The rear position P3 is a position on the optical axis ZO on the rearmost lens surface of the lens group 3. In the optical path of FIG. 3, the visible light L11 on the optical axis ZO in the lens group 3 exits from the rear position P3 in the +Z direction, to be incident on the light splitter 21. Further, the incident visible light L11 passes through the inside of the light splitter 21 and exits the light splitter 21 in the +Z direction, to reach the imaging position P1. The air conversion optical path length of the optical path, that is, an air conversion length Lvis corresponds to a focal length Fvis of the visible light L11 by the lens group 3.

For example, in the infinity focusing state of the optical system 2, as the imaging position P1 is located at the focal point of the lens group 3, the difference between the air conversion length Lvis and the focal length Fvis is expressed by the distance difference between the rear position P3 of the lens group 3 and the principal point. In the focusing state with a finite subject distance, the shorter the subject distance, the farther the imaging position P1 of the visible light L11 is from the focal point of the lens group 3, and the longer the air conversion length Lvis of the back focus is.

Figure 4:
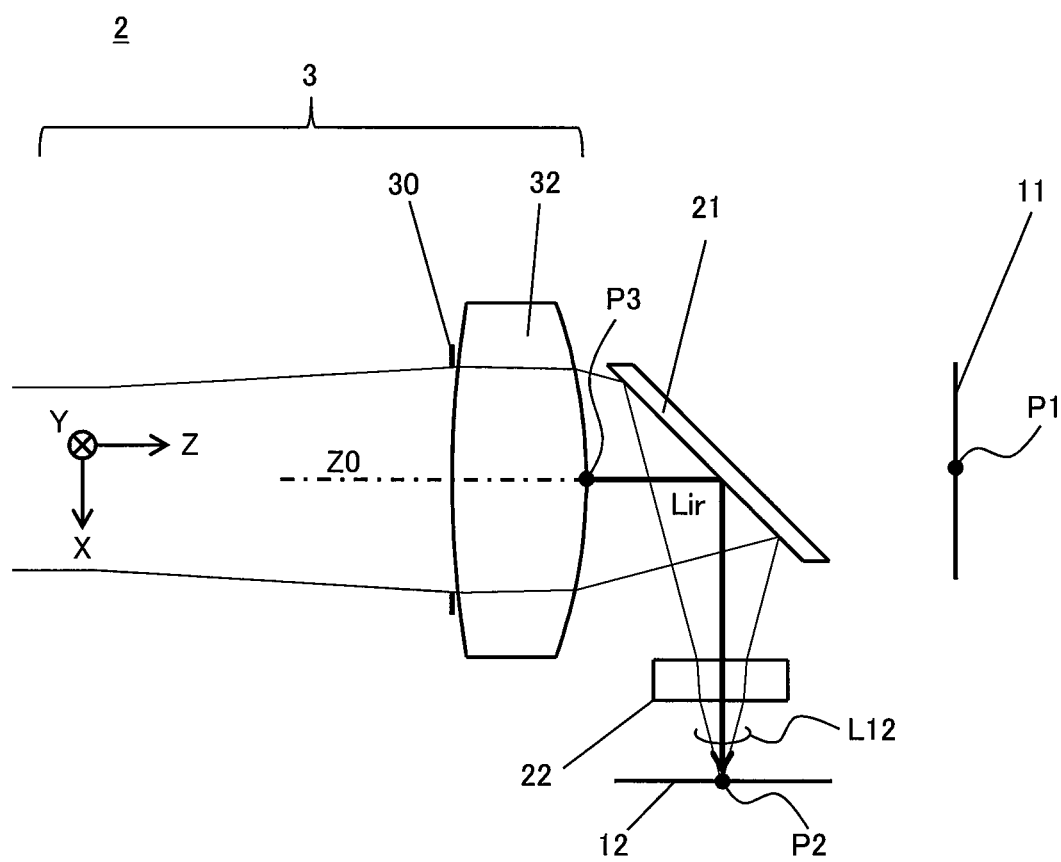
FIG. 4 is a diagram showing an optical path of far-infrared light in the back focus of the optical system.

FIG. 4 shows an optical path of the far-infrared light L12 from the rear position P3 of the lens group 3. In the optical path, the far-infrared light L12 on the optical axis ZO in the lens group 3 is incident on the light splitter 21 from the rear position P3 similarly to the visible light L11, and then the incident far-infrared light L12 is reflected from the light splitter 21 in the +X direction. The reflected far-infrared light L12 passes through the far-infrared transmission filter 22 to reach the imaging position P2. The air conversion length Lir of the optical path and the focal length Fir of the far-infrared light L12 by the lens group 3 have the same correspondence as in the case of the visible light L11 described above.

In the optical system 2 of the present embodiment, the lens group 3 is configured such that the air conversion length Lvis of the visible light L11 is shorter than the air conversion length Lir of the far-infrared light L12 for each optical path of the back focus as shown in FIGS. 3 and 4. Accordingly, in the optical system 2 having the above-described small configuration, it can be facilitated to obtain the performance of accurately forming an image in both the visible range and the far-infrared range by using the wavelength dependency of the lens material and the like.

2-1-1. Optimization of Back Focus

Furthermore, in an optical system 2 of a first example in the present embodiment, the lens group 3 is configured to satisfy the following conditional expression (1).

$$0.13 < (Lir - Lvis)/Fir < 0.23 \quad (1)$$

In the evaluation of the above expression (1), as the wavelength of the visible light L11, a wavelength λvis=587 nm of the d line generally used as a reference wavelength in the visible range is used. As the wavelength of the far-infrared light L12, a wavelength λir=10 μm, which is in a so-called atmospheric window that is fine to use in various applications and is also a peak wavelength of light emitted from a substance at room temperature in the far-infrared range, is used. Hereinafter, the middle side (Lir−Lvis)/Fir in the above expression (1) may be referred to as a factor Lf.

According to the optical system 2 satisfying the above expression (1), it is possible to optimize the back focus in the above-described small configuration and to improve the imaging performance in both the visible range and the far-infrared range. Finding about the conditional expression (1) will be described with reference to FIG. 5.

FIG. 5 is a diagram showing data of various lens materials. In FIG. 5, as examples of various lens materials applicable to the optical system 2, names, compositions, refractive indexes nvis and nir of the respective wavelengths λvis and λir, and a ratio Nr to be described later are shown.

As shown in FIG. 5, the refractive index nvis of the visible light L11 and the refractive index nir of the far-infrared light L12 have various values in various lens materials. On the other hand, the above expression (1) uses universal characteristics commonly seen in various wavelength dependent lens materials as the following finding, and can be applied to various optical systems that are not limited in the lens materials and the number of lens materials.

First, regarding the difference (Lir−Lvis) in the air conversion length in the factor Lf of the above expression (1), the position of the principal point in the lens group 3 is considered to have little or no change for each wavelength, for example. In view of this, the difference (Lir−Lvis) in the air conversion length can be approximated by a difference between the focal length Fvis of the visible light L11 and the focal length Fir of the far-infrared light L12 as in the following expression (11).

$$Lir - Lvis \approx Fir - Fvis \quad (11)$$

In addition, each of the focal lengths Fvis and Fir can be approximated as the following expression (12) based on the expression of the lens manufacturer in a case where the lens group 3 is regarded as a thin lens. Note that C is a constant defined by the curvature of the lens.

$$Fvis \approx C/(nvis-1)$$

$$Fir \approx C/(nir-1) \quad (12)$$

According to the above expressions (11) and (12), the factor Lf in the conditional expression (1) can be approximated as in the following expression (13) using the refractive indexes nvis and nir for the visible light L11 and the far-infrared light L12.

$$Lf \approx (nvis-1)/(nir-1) - 1 \quad (13)$$

In the right side of the above expression (13), the refractive indexes nvis and nir are included as the ratio Nr=(nvis−1)/(nir−1). For example, the ratio Nr indicates a ratio between the deviation of the refractive index nir of the far-infrared light L12 and the deviation of the refractive index nvis of the visible light L11 from the refractive index n=1 of vacuum, and is considered to be a global physical characteristic such as a change in the refractive index over the far-infrared range and the visible range.

According to the ratio Nr of the refractive indexes nvis and nir as in the above expression (13), as shown in FIG. 5, variations in various lens materials are much smaller than variations in the refractive indexes nvis and nir themselves. As described above, the ratio Nr of the global physical characteristic have little or no change in various lens materials, and it is considered that the conditional expression (1) based on the ratio Nr can be universally applied.

The minimum value on the right side of the above expression (13) in FIG. 5 is "0.139" according to the chalcohalide CHA. The above expression (13) uses an approximation in which the optical system 2 is regarded as a thin lens. The left side of the above expression (13) in the actual optical system 2 tends to be larger than the ideal case as in the above approximation (i.e., the right side of the above expression (13)). The numerical range of the above expression (1) was found in consideration of practical variations due to various differences in the optical system such as the lens material and the number of lens materials.

2-1-2. Simulation of Imaging Performance

A numerical simulation of the optical system 2 for verifying the effect of the imaging performance according to the conditional expression (1) will be described with reference to FIGS. 6 to 8.

Figure 6:
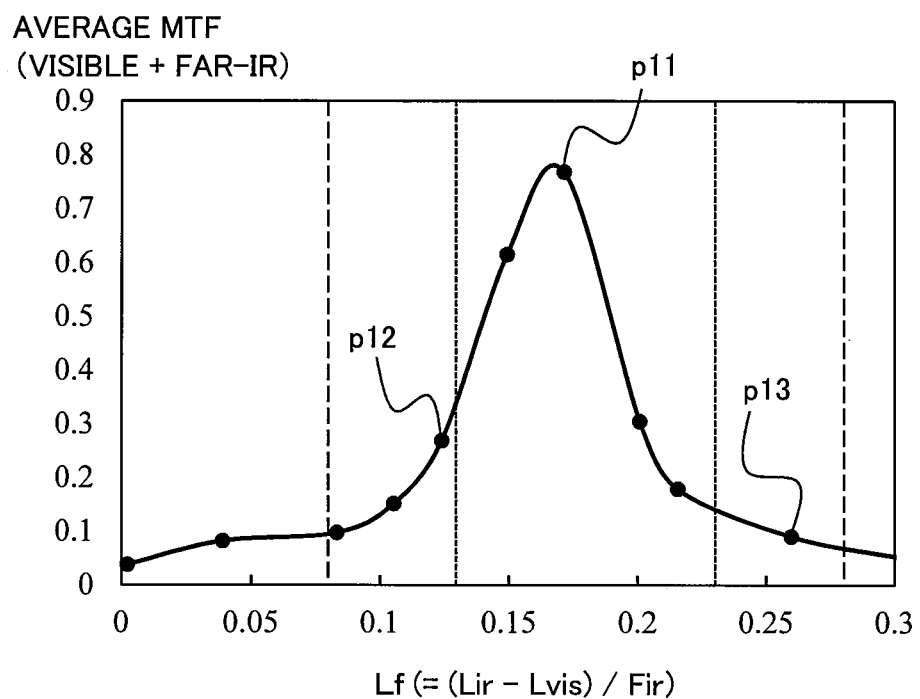
FIG. 6 is a graph showing a simulation result of imaging performance of the optical system of the first embodiment.

FIG. 6 is a graph showing a simulation result of imaging performance of the optical system 2 in the first embodiment. In FIG. 6, the horizontal axis represents the set value of the factor Lf (=(Lir−Lvis)/Fir) in the conditional expression (1), and the vertical axis represents the evaluation value of the average MTF (modulation transfer function). The average MTF is an average value of the MTF of the visible light L11 and the MTF of the far-infrared light L12 as described later.

In the numerical simulation of FIG. 6 with the configuration of the optical system 2 in the first embodiment, the factor Lf of the above expression (1) was set to various values, and the optical design was optimized at each set value. At this time, the software CODE V of Synopsys, Inc. was used. From the viewpoint of evaluating both the imaging performance of the visible light L11 and the imaging performance of the far-infrared light L12 in the designed optical system 2, the average MTF was used.

Each plot point in the graph of FIG. 6 corresponds to a separate example with a different optical design in the optical system 2 of the first embodiment. The first example corresponds to a plot point p11 of the factor Lf (=0.172) within the range defined in the conditional expression (1). A second example corresponds to a plot point p12 of the factor Lf (=0.124) below the lower limit of the expression (1), and a third example corresponds to a plot point p13 of the factor Lf (=0.260) above the upper limit. The setting of the factor Lf was changed by optical design in which the air conversion length Lvis of the visible light L11 is changed while fixing the focal length Fir and the air conversion length Lir of the far-infrared light L12.

Figure 7:
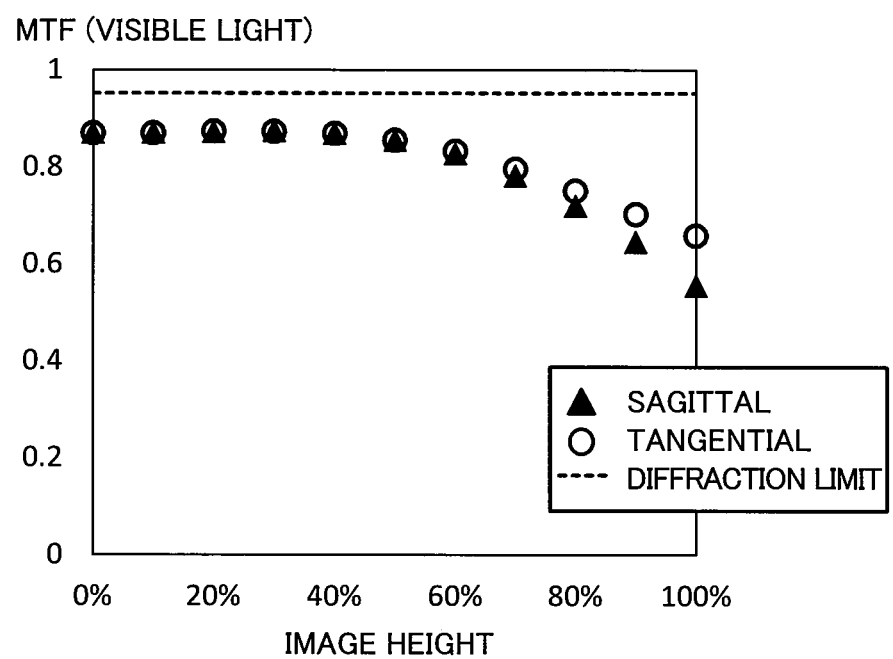
FIG. 7 is a graph showing MTF of the visible light in the optical system of the first embodiment.
Figure 8:
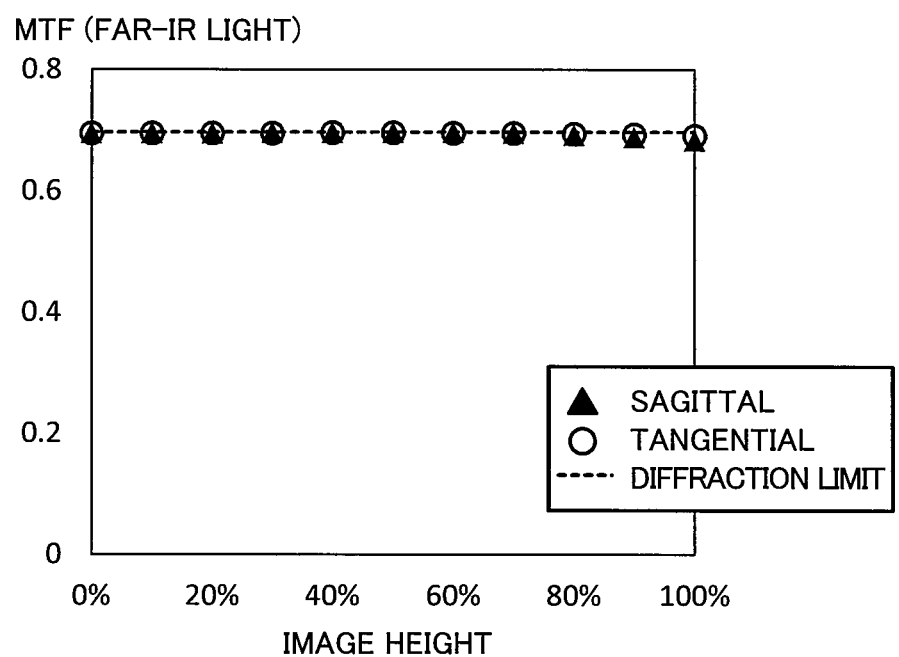
FIG. 8 is a graph showing MTF of the far-infrared light in the optical system of the first embodiment.

The MTF of the visible light L11 and the MTF of the far-infrared light L12 in the average MTF in the first example are shown in FIGS. 7 and 8, respectively. In FIGS. 7 and 8, the horizontal axis represents the image height in percentage, and the vertical axis represents the calculated value of each MTF. In each of FIGS. 7 and 8, the MTF curve in the sagittal direction, the MTF curve in the tangential direction, and the boundary line of the diffraction limit are shown.

In the MTF of the visible light L11 shown in FIG. 7, the above-described wavelength λvis of the d line and the high-frequency spatial frequency of 30 lp/mm were used (lp: line pairs). In the MTF of the far-infrared light L12 shown in FIG. 8, the above-described wavelength λir and the low-frequency spatial frequency of 10 lp/mm were used. In such setting of the spatial frequency, the pixel pitch of each of the imaging sensors 11 and 12 was taken into consideration. That is, as the pixel pitch of the far-infrared imaging sensor 12 is considered to be larger than the pixel pitch of the visible imaging sensor 11 as a physical limit, the spatial frequency of the far-infrared MTF was set to be lower than the spatial frequency of the visible MTF.

In the MTF of the visible light L11 and the MTF of the far-infrared light L12 obtained as shown in FIGS. 7 and 8, the average MTF was calculated by average calculation of image heights of 0%, 30%, 60%, and 100% in the sagittal direction and the tangential direction, respectively. It is considered that the imaging performance of the visible light L11 and the far-infrared light L12 is higher as the average MTF is larger.

According to the graph of FIG. 6, the graph has a graph shape bulging in a mountain shape in the numerical range of the following expression (1a) including the numerical range of the conditional expression (1).

$$0.08 < (Lir-Lvis)/Fir < 0.28 \quad (1a)$$

In the range of the above expression (1a), the average MTF in the optical system 2 of the first example satisfying the conditional expression (1) is significantly larger than the average MTF in the second and third examples not satisfying the conditional expression (1). As described above, the effect of improving the imaging performance of the visible light L11 and the far-infrared light L12 can be verified according to the conditional expression (1).

2-2. Numerical Examples

First to third numerical examples showing the first to third examples of the optical system 2 of the first embodiment as described above will be described with reference to FIGS. 9 to 11.

FIG. 9 is a table showing the first numerical example of the optical system 2 of the first embodiment. The table of FIG. 9 includes surface data D11a, aspherical surface data D11b, and various data D11c of the optical system 2 of the first example in the present embodiment.

The surface data D11a indicates the shape of each surface, the curvature radius, the surface interval, and the material of each of surfaces S1 to S11 arranged in order in the optical system 2 from the object side, with remarks being added. For example, the surface number S2 is a lens surface on the object side of the first lens element 31, and has an aspherical shape. The surface number S1 represents an object such as the subject 10 located at infinity (see Remarks). Further, in the surface data D11a of FIG. 9, the surface number S7 is a surface on the object side of the light splitter 21, and surfaces subsequent to this surface indicate a surface through which the optical path of the visible light L11 passes and a surface through which the optical path of the far-infrared light L12 passes (see FIGS. 3 and 4).

The aspherical surface data D11b indicates various coefficients of the following expression (2) defining the shape of the aspherical surface for each of the surfaces S2 and S3 having an aspherical shape in the surface data D11a.

$$z = \frac{h^2/r}{1 + \sqrt{1 - (1+\kappa)(h/r)^2}} + \sum A_n h^n \quad (2)$$

In the above expression (2), h is a radial height, k is a conic constant, and An is an nth-order aspheric surface coefficient. In the second term on the right side of the above expression (2), for example, n is an even number of 4 or more and 20 or less, and the sum for each n is taken. According to the above expression (2), the sag amount z at the height h in the radial direction on the target surface is defined rotationally symmetrically.

The various data D11c indicates the F-number of the diaphragm 30, the entire angle of view, and the focal length Fir of the far-infrared light L12 in the optical system 2. The optical system 2 of the present example has the focal length Fvis of the visible light L11=5.8 mm.

According to the above numerical example, the optical system 2 of the first example of the first embodiment has the air conversion length Lvis of the visible light L11=6.550 mm and the air conversion length Lir of the far-infrared light L12=7.721 mm in the back focus. According to this, the factor Lf and the average MTF in the conditional expression (1) are obtained as indicated by the plot point p11 in FIG. 6.

FIG. 10 is a table showing the second numerical example of the optical system 2 of the first embodiment. The table of FIG. 10 includes surface data D12a, aspherical surface data D12b, and various data D12c of the optical system 2 of the second example in the present embodiment. The data D12a to D12c indicate the same information as the data D11a to D11c of the first example for the optical system 2 of the second example of the present embodiment.

In the second example of the present embodiment, in order to extend the air conversion length Lvis of the visible light L11 as compared with the first example, as shown in FIG. 10, the surface interval for the surface number S8 of the surface data D12a is changed from that in FIG. 9, and the optical design such as the surface shape is optimized. In the optical system 2 of the second example of the first embodiment, the air conversion length Lir and the focal length Fir of the far-infrared light L12 are the same as those of the first example, and the air conversion length Lvis of the visible light L11 is 6.879 mm. Thus, the factor Lf and the average MTF shown at the plot point p12 in FIG. 6 are obtained.

FIG. 11 is a table showing the third numerical example of the optical system 2 of the first embodiment. The table of FIG. 11 includes surface data D13a, aspherical surface data D13b, and various data D13c of the optical system 2 of the third example in the present embodiment. The data D13a to D13c indicate the same information as the data D11a to D11c of the first example for the optical system 2 of the third example of the present embodiment.

In the third example of the present embodiment, the optical design is optimized by shortening the air conversion length Lvis of the visible light L11 as compared with the first example, contrary to the second example. In the optical system 2 of the third example of the first embodiment, the air conversion length Lir and the focal length Fir of the far-infrared light L12 are the same as those of the first example, and the air conversion length Lvis of the visible light L11 is 5.950 mm. Thus, the factor Lf and the average MTF shown at the plot point p13 in FIG. 6 are obtained.

According to the optical system 2 of each of the first to third examples as described above, as shown in FIG. 6, not only the plot point p11 of the first example but also the plot points p12 and p13 of the second and third examples have a higher average MTF than that in the case of the factor Lf=0. Therefore, according to the optical system 2 of each of the first to third examples of the present embodiment, by making the air conversion length Lvis of the visible light L11 shorter than the air conversion length Lir of the far-infrared light L12, the imaging performance of both the visible light L11 and the far-infrared light L12 can be improved.

3. Summary

As described above, the optical system 2 in the present embodiment forms an image at the imaging position P1 as an example of a first imaging position with the visible light L11 as an example of first light having a wavelength in the visible range. The optical system 2 forms an image at the imaging position P2 as an example of a second imaging position with the far-infrared light L12 as an example of second light having a wavelength in the far-infrared range. The optical system 2 includes the lens group 3 and the light splitter 21 The lens group 3 has the optical axis ZO extending from the front on which the visible light L11 and the far-infrared light L12 are incident to the rear where the visible light L11 and the far-infrared light L12 are emitted, the focal length Fvis of the visible light L11, and the focal length Fir of the far-infrared light L12. The light splitter 21 is disposed at the rear side of the lens group 3, and splits the visible light L11 and the far-infrared light L12 from the lens group 3 from each other, to guide the visible light L11 onto the imaging position P1, and guide the far-infrared light L12 onto the imaging position P2. The lens group 3 includes the lens elements 31 and 32 that transmit the visible light L11 and the far-infrared light L12 to match the imaging position P1 with the focal length Fvis of the visible light L11 and match the imaging position P2 with the focal length Fir of the far-infrared light L12 separately from the imaging position P1.

According to the optical system 2 described above, the imaging position P1 of the visible light L11 and the imaging position P of the far-infrared light L12 are set corresponding to the focal lengths Fvis and Fir of the lens group 3, respectively, and the lens group 3 in front of the light splitter 21 constitutes both imaging optical systems. According to this, the configuration of the back focus behind the light splitter 21 can be simplified in the optical system 2, and it is possible to facilitate both visible imaging and far-infrared imaging, such as downsizing of the imaging device 1. The first light may not be necessarily have the wavelength in the visible range. For example, the first light may be have a wavelength in the near-infrared range, which is also shorter than the wavelength of the far-infrared range but longer than the wavelength in the visible range.

In the optical system 2 of the present embodiment, the air conversion length Lvis, which is an example of a first air conversion length at which the visible light L11 passes from the position of the rear end of the lens group 3, that is, the rear position P3 to the imaging position P1, is shorter than the air conversion length Lir, which is an example of a second air conversion length at which the far-infrared light L12 passes from the rear position P3 to the imaging position P2. According to this, both the imaging performance of the visible light L11 and the imaging performance of the far-infrared light L12 can be easily secured by the lens group 3.

The optical system 2 in the present embodiment may satisfy the conditional expression (1) based on the air conversion length Lvis of the visible light L11, the air conversion length Lir of the far-infrared light L12, and the focal length Fir of the far-infrared light L12 in the back focus. According to this, the back focus in the optical system 2 can be optimized to improve both the imaging performance of the visible light L11 and the imaging performance of the far-infrared light L12. In addition, the optical system 2 in the present embodiment may satisfy the numerical range of the above expression (1a) instead of the conditional expression (1).

The optical system 2 in the present embodiment may satisfy the conditional expression (1) when the wavelength of the visible light L11 is λvis=587 nm and the wavelength of the far-infrared light L12 is λir=10 μm. Such wavelengths λvis and λvis are useful in visible imaging and far-infrared imaging, respectively.

In the optical system 2 in the present embodiment, the lens element is not provided behind the light splitter 21, and the lens elements 31 and 32 of the lens group 3 are provided in front of the light splitter 21. Thus, the optical system 2 can be downsized.

In the optical system 2 of the present embodiment, the first lens element 31 in the lens group 3 is made of chalcohalide glass. According to this, the optical system 2 having optical transparency in the visible range and the far-infrared range can be provided with a material that is easy to handle in various applications. The lens element of the chalcohalide material is not particularly limited to the first lens element 31. The first lens element 31 may be made of a lens material other than the chalcohalide material.

In the optical system 2 of the present embodiment, the light splitter 21 has an optical characteristic of transmitting the visible light L11 and reflecting the far-infrared light L12. According to this, in the back focus of the optical system 2, the optical path of the far-infrared light L12 that is considered to be longer than the optical path of the visible light L11 is bent (see FIGS. 3 and 4), and the optical system 2 can be easily downsized.

In the present embodiment, the imaging device 1 includes the optical system 2, the visible imaging sensor 11 as an example of the first image sensor, and the far-infrared imaging sensor 12 as an example of the second image sensor. The visible imaging sensor 11 is disposed at the imaging position P1 of the visible light L11 by the optical system 2, and captures an image with the visible light L11. The far-infrared imaging sensor 12 is disposed at the imaging position P2 of the far-infrared light L12 by the optical system 2, and captures an image with the far-infrared light L12. According to the imaging device 1 of the present embodiment, the configuration for achieving both visible imaging and far-infrared imaging can be downsized by the optical system 2, and the imaging performance of both can be improved, so that both can be easily achieved.

In the present embodiment, the imaging system 20 includes the imaging device 1 and the controller 15 as an example of the control circuit that analyzes the various images Im1 and Im2 captured by the imaging device 1. According to the present system 20, both the analysis of the visible image Im1 and the analysis of the far-infrared image Im2 can be easily performed by the optical system 2 of the imaging device 1.

Second Embodiment

Hereinafter, a second embodiment will be described with reference to FIG. 12 to FIG. 16. In the first embodiment, an example in which the lens material is different between the two lens elements 31 and 32 in the optical system 2 has been described. In the second embodiment, an optical system in which lens materials are formed of the same lens element will be described.

Hereinafter, description of configurations and operations similar to those of the optical system 2 and the imaging device 1 according to the first embodiment will be omitted as appropriate, and the optical system according to the present embodiment will be described.

Figure 12:
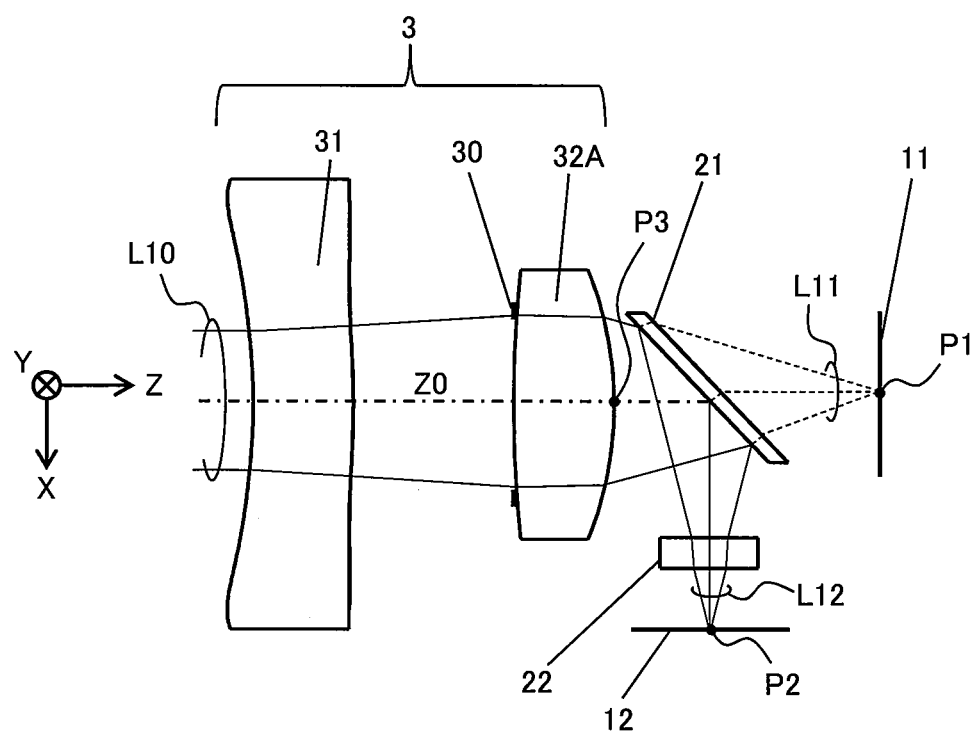
FIG. 12 is a diagram showing a configuration of an optical system according to a second embodiment.

FIG. 12 shows a configuration of an optical system 2A according to the second embodiment. In the first embodiment, zinc sulfide is exemplified as the lens material of the second lens element 32. In the optical system 2A according to the present embodiment, in the similar configuration to the optical system 2 of the first embodiment, the lens material of the second lens element 32A is made of the same chalcohalide glass as that of first lens element 31. According to the optical system 2A of the present embodiment, a lens group 3A can be made of glass having high productivity and processability, and can be easily used in various applications.

Figure 13:
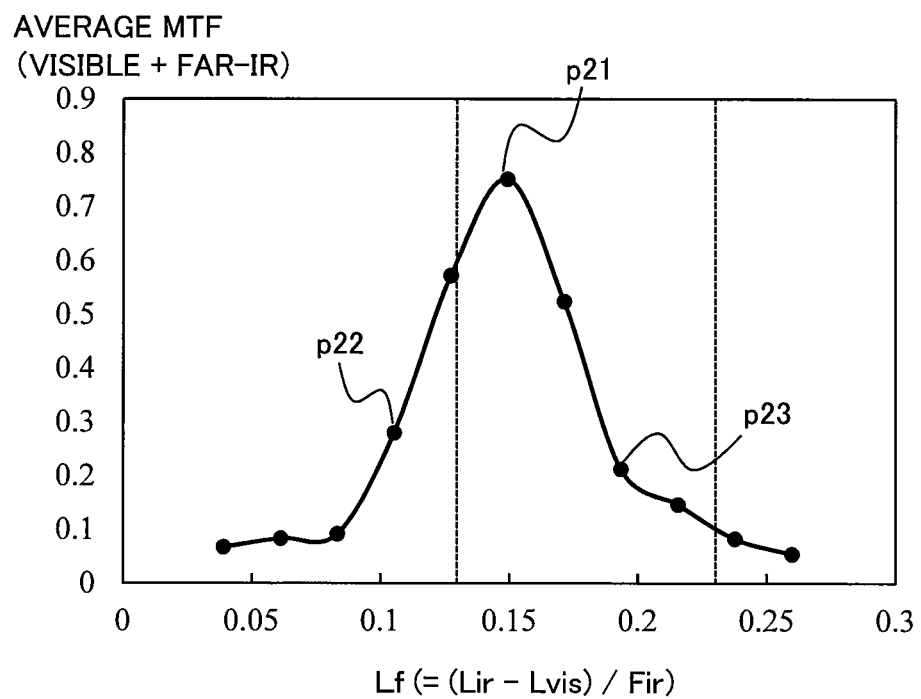
FIG. 13 is a graph showing a simulation result of imaging performance of the optical system of the second embodiment.

FIG. 13 is a graph showing a simulation result of the imaging performance of the optical system 2A of the present embodiment. In the numerical simulation of FIG. 13, the optical design of the optical system 2A of the second embodiment was optimized by setting the factor Lf to various values similarly to FIG. 6 of the first embodiment. The first, second, and third examples of the second embodiment correspond to plot points p21, p22, and p23 in the graph of FIG. 13, respectively.

FIG. 14 shows the first numerical example of the optical system 2A of the second embodiment similarly to the first embodiment. Specifically, surface data D21a, aspherical data D21b, and various data D21c in FIG. 14 indicate information on the optical system 2A of the first example in the present embodiment similarly to the data D11a to D11c in FIG. 9. The optical system 2A of the present example has a factor Lf that satisfies the conditional expression (1) as indicated by the plot point p21 in FIG. 13.

FIG. 15 shows the second numerical example of the optical system 2A of the second embodiment similarly to the above example. Surface data D22a, aspherical data D22b, and various data D22c in FIG. 15 indicate information on the optical system 2A of the second example in the present embodiment. The optical system 2A of the present example has a factor Lf that falls below the lower limit value of the conditional expression (1) as indicated by the plot point p22 in FIG. 13.

FIG. 16 shows the third numerical example of the optical system 2A of the second embodiment similarly to the above example. Data D23a, D23b, and D23c in FIG. 16 indicate information on the optical system 2A of the third example in the present embodiment. As indicated by the plot point p23 in FIG. 13, the optical system 2A of the present example has a factor Lf higher than that of the first example.

As shown in FIG. 13, the average MTF between the visible light L11 and the far-infrared light L12 in the optical system 2A of each of the first to third examples of the present embodiment is particularly high within the range in which the factor Lf is defined by the conditional expression (1). Similarly to the first embodiment, the optical system 2A of the present embodiment can also improve the imaging performance of both the visible light L11 and the far-infrared light L12 in the small configuration.

Third Embodiment

Hereinafter, a third embodiment will be described with reference to FIGS. 17 to 21. In the first and second embodiments, the example in which the number of lenses in the lens group 3 is two and the focal length Fir=6.8 mm has been described, but the present disclosure is not limited thereto. In the third embodiment, an example in which the number of lenses is 3 and the focal length Fir=15 mm will be described.

Hereinafter, the description similar to the first and second embodiments will be appropriately omitted, and an optical system according to the present embodiment will be described.

Figure 17:
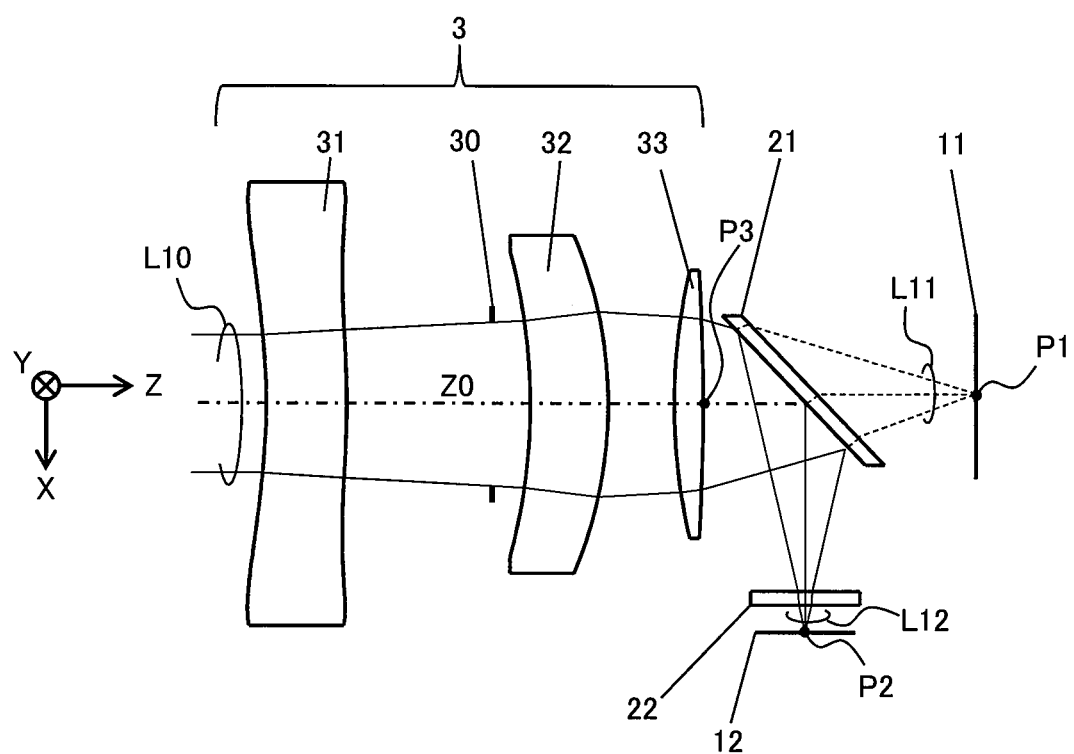
FIG. 17 is a diagram showing a configuration of an optical system according to a third embodiment.

FIG. 17 shows a configuration of an optical system 2B according to the third embodiment. The optical system 2B according to the present embodiment further includes a third lens element 33 disposed behind the second lens element 32 in the lens group 3, in addition to the similar configuration to the optical system 2 of the first embodiment. For example, the third lens element 33 is made of a lens material that transmits the visible light L11 and the far-infrared light L12, such as chalcohalide CHA. Also in the optical system 2B of the present embodiment, numerical simulations of various examples were performed similarly to the first and second embodiments.

Figure 18:
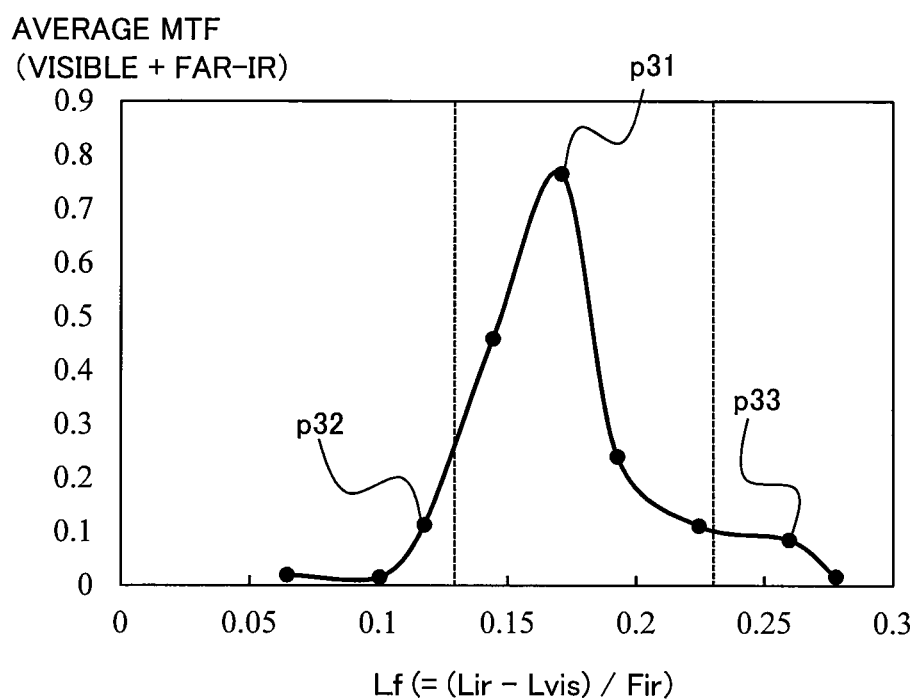
FIG. 18 is a graph showing a simulation result of imaging performance of the optical system of the third embodiment.

FIG. 18 is a graph showing a simulation result of the imaging performance of the optical system 2B of the present embodiment. In the first, second, and third examples of the third embodiment, as indicated by plot points p31, p32, and p33 in the graph of FIG. 18, factors Lf were set to 0.182 mm, 0.111 mm, and 0.260 mm, respectively.

FIG. 19 shows the first numerical example of the optical system 2B of the third embodiment similarly to each of the above embodiments. Surface data D31a, aspherical data D31b, and various data D31c in FIG. 19 indicate information on the optical system 2B of the first example in the present embodiment. The optical system 2B of the present example satisfies the conditional expression (1), with an air conversion length Lvis of the visible light L11=15.159 mm and an air conversion length Lir of the far-infrared light L12=17.889 mm in the back focus.

FIGS. 20 and 21 show the second and third numerical examples of the optical system 2B of the third embodiment similarly to the above example. Data D32a to D32c and D33a to D33c in FIGS. 20 and 21 indicate information on the optical system 2B of the second and third examples in the present embodiment. The optical system 2B of the second example has the same air conversion length Lir of the far-infrared light L12 as in the first example and an air conversion length Lvis of the visible light L11=16.219 mm, and falls below the lower limit value of the conditional expression (1). The optical system 2B of the third example has an air conversion length Lvis of the visible light L11=16.829 mm and an air conversion length Lir of the far-infrared light L12=20.724 mm, and exceeds the upper limit value of the conditional expression (1).

Also in the average MTF in the optical system 2B of each of the first to third examples of the present embodiment, as shown in FIG. 18, the factor Lf is particularly high within the range of the conditional expression (1). The optical system 2B of the present embodiment can also improve the imaging performance of both the visible light L11 and the far-infrared light L12 similarly to each of the above embodiments.

Fourth Embodiment

Hereinafter, a fourth embodiment will be described with reference to FIGS. 22 to 26. In the fourth embodiment, an example in which the number of lenses is larger than that in the third embodiment will be described.

Hereinafter, the description similar to the first to third embodiments will be appropriately omitted, and an optical system according to the present embodiment will be described.

Figure 22:
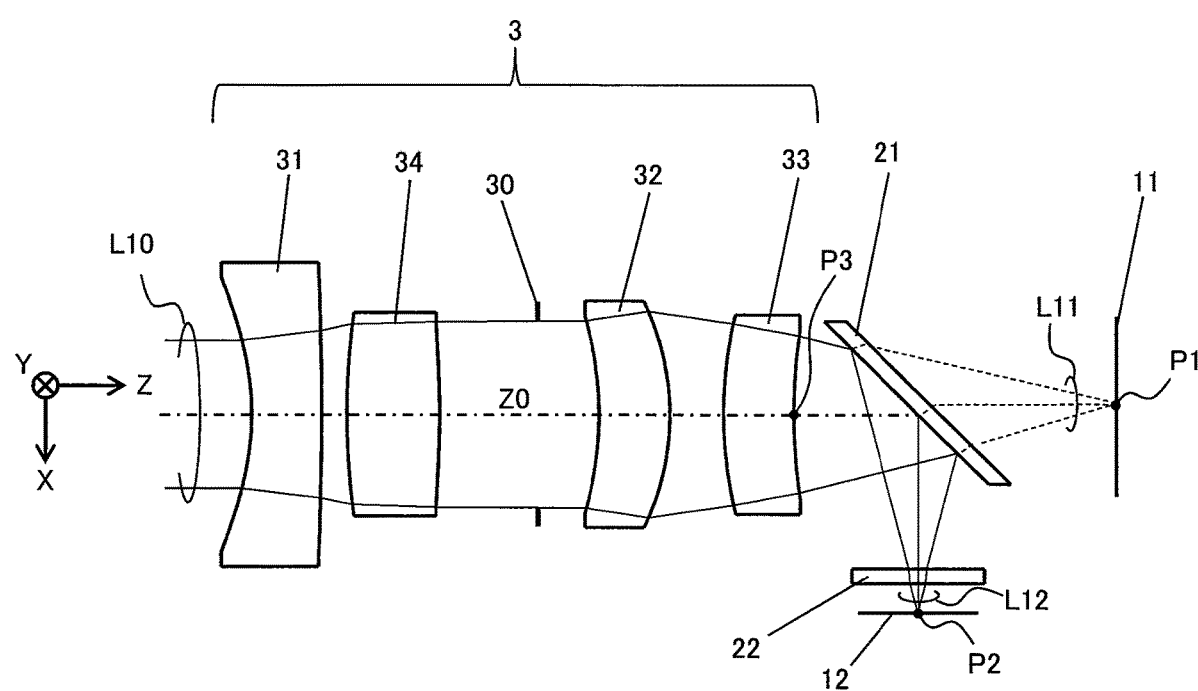
FIG. 22 is a diagram showing a configuration of an optical system according to a fourth embodiment.

FIG. 22 shows a configuration of an optical system 2C according to the fourth embodiment. The optical system 2C according to the present embodiment further includes a fourth lens element 34 disposed behind the first lens element 31 in the lens group 3, in addition to the similar configuration to the optical system 2B of the third embodiment. The fourth lens element 34 is made of a lens material that transmits the visible light L11 and the far-infrared light L12. Also in the optical system 2C of the present embodiment, numerical simulations of various examples were performed similarly to the first to third embodiments.

Figure 23:
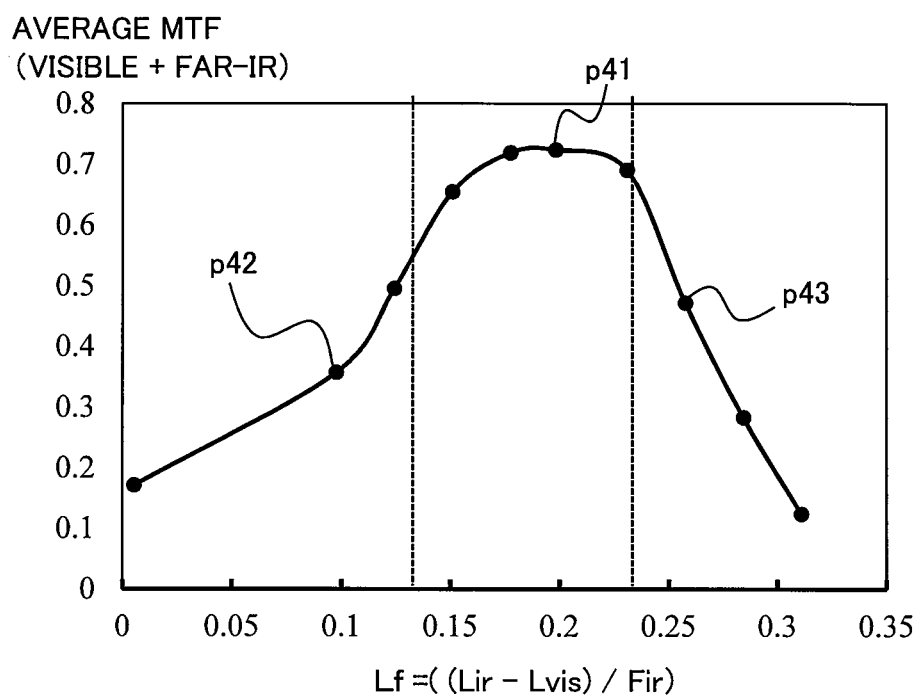
FIG. 23 is a graph showing a simulation result of imaging performance of the optical system of the fourth embodiment.

FIG. 23 is a graph showing a simulation result of the imaging performance of the optical system 2C of the present embodiment. In the first, second, and third examples of the fourth embodiment, as indicated by plot points p41, p42, and p43 in the graph of FIG. 18, factors Lf were set to 0.196 mm, 0.096 mm, and 0.255 mm, respectively.

FIGS. 24 to 26 show the first to third numerical examples of the optical system 2C of the fourth embodiment similarly to each of the above embodiments. Data D41a to D41c, D42a to D42c, and D43a to D43c in FIGS. 24, 25, and 26 indicate information on the optical system 2C of the first, second, and third examples in the present embodiment.

In the present embodiment, the optical system 2C of the first example has an air conversion length Lvis of the visible light L11=12.750 mm and an air conversion length Lir of the far-infrared light L12=15.695 mm in the back focus, and satisfies the conditional expression (1). The optical system 2C of the second example has the same air conversion length Lir of the far-infrared light L12 as in the first example and an air conversion length Lvis of the visible light L11=14.260 mm, and falls below the lower limit value of the conditional expression (1). The optical system 2C of the third example has the same air conversion length Lir of the far-infrared light L12 as in the first example and an air conversion length Lvis of the visible light L11=11.863 mm, and exceeds the upper limit value of the conditional expression (1).

Also in the average MTF in the optical system 2C of each of the first to third examples of the present embodiment, as shown in FIG. 23, the factor Lf is particularly high within the range of the conditional expression (1). The optical system 2C of the present embodiment can also improve the imaging performance of both the visible light L11 and the far-infrared light L12 similarly to each of the above embodiments. In FIG. 23, the graph shape is flattened within the range of the conditional expression (1) as compared with FIG. 6 and the like. According to the present embodiment, it is possible to easily improve the imaging performance by increasing the number of lenses.

In the above description, an example has been described in which the number of lenses in the lens group 3 of the optical system 2C is four or less, but the number of lenses may be five or more. Also in this case, the imaging performance can be improved similarly to each of the above embodiments.

OTHER EMBODIMENTS

As described above, the first to fourth embodiments have been described as an example of the technology disclosed in the present application. However, the technology in the present disclosure is not limited to this, and is applicable to embodiments in which changes, replacements, additions, omissions, and the like are appropriately made. Further, each component described in each of the above embodiments can be combined to make a new embodiment. Therefore, other embodiments are described below.

In the above embodiments, the optical system 2, 2A to 2C in which the light splitter 21 transmits the visible light L11 and reflects the far-infrared light L12 has been exemplified, but the present disclosure is not limited thereto. A modification of this point will be described with reference to FIG. 27.

Figure 27:
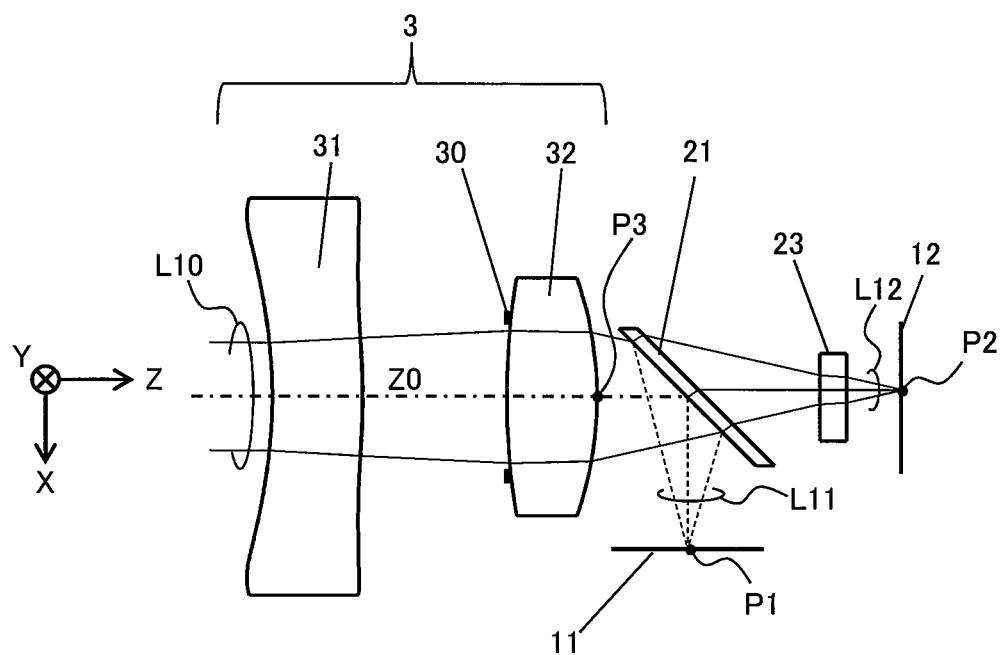
FIG. 27 is a diagram showing a modification of the optical system of the first embodiment.

FIG. 27 shows a configuration of an optical system 2D of a modification of the first embodiment. For example, the optical system 2D of the present modification includes a light splitter 23 that reflects the visible light L11 and transmits the far-infrared light L12 instead of the light splitter 21 of FIG. 2 in the same configuration as that of the first embodiment. For example, the light splitter 23 of the present modification includes a band pass filter in which the wavelength band of the far-infrared light L12 is set to the transmission band in advance. In the optical system 2D of the present modification, the far-infrared transmission filter 22 is disposed on the +Z side of the light splitter 23, for example.

In the optical system 2D of the present modification, in the incident light L10 emitted from the lens group 3 in the +Z direction, the visible light L11 is reflected by the light splitter 23 to exit in the +X direction, and the far-infrared light L12 is transmitted through the light splitter 23 to exit in the +Z direction. In the present modification, the above-described conditional expression (1) may be satisfied by the air conversion length Lvis of the optical path of the visible light L11 and the air conversion length Lir of the optical path of the far-infrared light L12. Also with the optical system 2D of the present modification similarly to the above, it is possible to easily realize the imaging device 1 that achieves both visible imaging and far-infrared imaging.

In the above embodiments, an example in which the light splitters 21 and 23 are configured by the band pass filter has been described. In the present embodiment, the light splitters 21 and 23 are not limited to the band pass filter, and may be configured by various band splitters, e.g. a high pass filter or a low pass filter.

In the above embodiments, an example in which the far-infrared transmission filter 22 is provided in the optical system 2, 2A to 2D has been described. In the present embodiment, the far-infrared transmission filter 22 may be provided integrally with the far-infrared imaging sensor 12 or the light splitter 21. The far-infrared transmission filter 22 may be omitted from the optical system 2, 2A to 2D.

In the above embodiments, an example has been described in which no optical element other than the far-infrared transmission filter 22 is disposed between the light splitters 21 and 23 and the imaging positions P1 and P2, but the present disclosure is not limited thereto. In the present embodiment, various optical elements may be disposed between the light splitters 21 and 23 and the imaging positions P1 and P2, and for example, various wavelength filters, polarizing filters, polarizing plates, mirrors, and the like may be disposed. Furthermore, in the present embodiment, the lens element is not necessarily excluded from the optical elements that can be disposed between the light splitters 21 and 23 and the respective imaging positions P1 and P2, and for example, the lens element can also be disposed depending on the small refractive power.

In the above embodiments, the optical system 2, 2A to 2D including the aspheric lens surface has been exemplified. The optical system of the present embodiment may not include an aspherical lens surface, and for example, all the lens elements included in the lens group 3 may be spherical lenses. In addition, the optical system of the present embodiment may include a lens element having a free-form surface that is not rotationally symmetric in the lens group 3.

As described above, the embodiments have been described as an example of the technology in the present disclosure. For this purpose, the accompanying drawings and the detailed description have been provided.

Accordingly, some of the components described in the accompanying drawings and the detailed description may include not only essential components for solving the problem but also components which are not essential for solving the problem in order to describe the above technology. Therefore, it should not be immediately recognized that these non-essential components are essential based on the fact that these non-essential components are described in the accompanying drawings and the detailed description.

Further, the above-described embodiments are provided to show the technology in the present disclosure, and hence it is possible to make various changes, replacements, additions, omissions, and the like within the scope of claims or the equivalent thereof.

The present disclosure is applicable to various applications in which visible imaging and far-infrared imaging are combined.

The invention claimed is:

1. An optical system for forming an image at a first imaging position with first light and forming another image at a second imaging position with second light having a wavelength in a far-infrared range in which a wavelength is longer than a wavelength of the first light, the optical system comprising:

a lens group having an optical axis, a focal length of the first light, and a focal length of the second light, the optical axis extending from a front side on which the first light and the second light are incident to a rear side on which the first light and the second light are emitted; and a light splitter disposed at the rear side of the lens group and splitting the first light and the second light incident from the lens group respectively, to guide the first light onto the first imaging position and guide the second light onto the second imaging position, wherein the lens group includes lens elements transmitting the first light and the second light to match the first imaging position with the focal length of the first light and match the second imaging position with the focal length of the second light separately from the first imaging position, wherein the lens elements of the lens group are provided in the front side of the light splitter with no lens element being provided in the rear side of the light splitter, wherein with the wavelength of the first light being in a visible range, following expression (1a) is satisfied:

$$0.08<(Lir-Lvis)/Fir<0.28 \tag{1a}$$

where

Lvis is a first air conversion length by which the first light passes from a position of a rear end in the lens group to the first imaging position, Lir is a second air conversion length by which the second light passes from the position of the rear end to the second imaging position, and Fir is the focal length of the second light.

2. The optical system according to claim 1, wherein the lens group includes two lens elements and a diaphragm disposed between the two lens elements.

3. The optical system according to claim 1, wherein at least one lens element in the lens group is made of chalcohalide glass.

4. The optical system according to claim 1, wherein the light splitter has an optical characteristic to transmit the first light and to reflect the second light.

5. The optical system according to claim 1, wherein the light splitter splits the first light and the second light respectively, by transmitting the first light incident from the lens group and reflecting the second light incident from the lens group.

6. The optical system according to claim 1, wherein the expression (1) is satisfied with the wavelength of the first light being 587 nm and with the wavelength of the second light being 10 μm.

7. The optical system according to claim 1, wherein the wavelength of the first light is in a visible range, the wavelength in the visible range is 400 nm to 750 nm and the wavelength in the infrared range is 3 μm to 20 μm.

8. An imaging device comprising:

the optical system according to claim 1;

a first image sensor that is disposed at the first imaging position to capture the image formed with the first light; and a second image sensor that is disposed at the second imaging position to capture the image formed with the second light.

9. An imaging system comprising:
the imaging device according to claim 8; and
a control circuit that analyzes a captured image by the imaging device.

10. The optical system according to claim 1, wherein with the wavelength of the first light being in a visible range, following expression (1) is satisfied based on the first air conversion length Lvis, the second air conversion length Lir, and the focal length Fir of the second light $$0.13 < (Lir - Lvis)/Fir < 0.23 \quad (1).$$

11. An imaging device comprising:
the optical system according to claim 10;
a first image sensor that is disposed at the first imaging position to capture the image formed with the first light; and
a second image sensor that is disposed at the second imaging position to capture the image formed with the second light.

12. An imaging system comprising:
the imaging device according to claim 11; and
a control circuit that analyzes a captured image by the imaging device.

13. The optical system according to claim 10, wherein the lens group includes two lens elements and a diaphragm disposed between the two lens elements.

14. The optical system according to claim 10, wherein at least one lens element in the lens group is made of chalcohalide glass.

15. The optical system according to claim 10, wherein the light splitter has an optical characteristic to transmit the first light and to reflect the second light.

16. The optical system according to claim 10, wherein the light splitter splits the first light and the second light respectively, by transmitting the first light incident from the lens group and reflecting the second light incident from the lens group.

* * * * *